US012434477B2

(12) United States Patent
Takahashi et al.

(10) Patent No.: US 12,434,477 B2
(45) Date of Patent: Oct. 7, 2025

(54) PRINTER AND PRINTING METHOD

(71) Applicant: SCREEN HOLDINGS CO., LTD., Kyoto (JP)

(72) Inventors: Susumu Takahashi, Kyoto (JP); Osamu Morizono, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 136 days.

(21) Appl. No.: 18/279,163

(22) PCT Filed: Mar. 4, 2022

(86) PCT No.: PCT/JP2022/009396
§ 371 (c)(1),
(2) Date: Aug. 28, 2023

(87) PCT Pub. No.: WO2022/202223
PCT Pub. Date: Sep. 29, 2022

(65) Prior Publication Data
US 2024/0001679 A1 Jan. 4, 2024

(30) Foreign Application Priority Data
Mar. 23, 2021 (JP) ................................ 2021-049007

(51) Int. Cl.
*B41J 2/165* (2006.01)
*B41J 29/17* (2006.01)
*B41J 29/393* (2006.01)

(52) U.S. Cl.
CPC ....... *B41J 2/16547* (2013.01); *B41J 2/16508* (2013.01); *B41J 2/16523* (2013.01);
(Continued)

(58) Field of Classification Search
CPC ................................ B41J 29/17; B41J 29/393
See application file for complete search history.

(56) References Cited

U.S. PATENT DOCUMENTS

2008/0024532 A1* 1/2008 Kim .................... B41J 2/16585 347/33
2011/0249059 A1 10/2011 Takafuji
(Continued)

FOREIGN PATENT DOCUMENTS

JP 2006-240235 A 9/2006
JP 2012-176545 A 9/2012
(Continued)

OTHER PUBLICATIONS

International Search Report issued in corresponding International Patent Application No. PCT/JP2022/009396, dated May 24, 2022, with English translation.

*Primary Examiner* — Sharon Polk
(74) *Attorney, Agent, or Firm* — Rimon P.C.

(57) ABSTRACT

The maintenance unit is configured to be movable in the X direction, and moves between the facing position La facing the ejection head and the separation position Lb away from the ejection head in the X direction. Provided is the imaging part configured to image the imaging range Ri provided on the side of the separation position Lb relative to the facing position La in the X direction and the imaging part images at least part of the maintenance unit which overlaps the imaging range Ri to acquire the unit image I2. In other words, the unit image I2 representing the condition of the maintenance unit can be acquired by the imaging part.

28 Claims, 20 Drawing Sheets

(52) U.S. Cl.
CPC ........... *B41J 2/16579* (2013.01); *B41J 29/17* (2013.01); *B41J 29/393* (2013.01); *B41J 2002/16573* (2013.01)

(56) References Cited

U.S. PATENT DOCUMENTS

| | | | |
|---|---|---|---|
| 2013/0215191 | A1 | 8/2013 | Hutchison |
| 2019/0061354 | A1 | 2/2019 | Tsubota |

FOREIGN PATENT DOCUMENTS

| | | | |
|---|---|---|---|
| JP | 2014-165264 | A | 9/2014 |
| JP | 2019-038124 | A | 3/2019 |
| WO | 2010/071041 | A1 | 6/2010 |

* cited by examiner

F I G. 9

HISTORY INFORMATION I1

| APPARATUS ID | TIME | TYPE OF INK | TYPE OF WEB | INK DISCHARGE AMOUNT | PRINT DISTANCE |
|---|---|---|---|---|---|
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |

PRINTER AND PRINTING METHOD

CROSS REFERENCE TO RELATED APPLICATIONS

This application is the U.S. National Phase under 35 U.S.C. § 371 of International Application No. PCT/JP2022/009396, filed on Mar. 4, 2022, which claims the benefit of Japanese Application No. 2021-049007, filed on Mar. 23, 2021, the entire contents of each are hereby incorporated by reference.

TECHNICAL FIELD

The present invention relates to a technology for checking a condition of a maintenance unit for performing maintenance on an ejection head which ejects ink from a nozzle.

BACKGROUND

Conventionally, in a printer which performs printing on a base material by adhering ink onto the base material, an ejection head for ejecting ink from a nozzle is generally used. In such a printer, by performing maintenance on the ejection head as appropriate during a period while a printing operation is not performed, troubles such as clogging of the nozzle or the like are suppressed. In Patent Literature 1, for example, a recovery means (maintenance unit) performs maintenance such as capping for covering the nozzle of the ejection head and a wipe for cleaning the ejection head by using a wiper.

CITATION LIST

Patent Literature

[Patent Literature 1] 2006-240235

SUMMARY

Technical Problem

Japanese Patent Application Laid Open Gazette No.

When adhesion of ink to the maintenance unit or wear of the maintenance unit progresses along with execution of the maintenance, the maintenance of the ejection head cannot be appropriately performed. Then, an operator performs cleaning of the maintenance unit as appropriate. In order to determine whether or not the cleaning of the maintenance unit is needed, since the operator needs to open a cover of the printer and determine the condition of the maintenance unit by a visual check, an operational load of the operator was large.

The present invention is intended to solve the above-described problem, and it is an object of the present invention to make it possible to acquire the condition of a maintenance unit for performing maintenance on an ejection head which ejects ink from a nozzle, without requiring operation of an operator.

Solution to Problem

A printer according to the invention, comprises: an ejection head having a nozzle that ejects ink and configured to perform a printing operation of ejecting ink onto a base material from the nozzle; a maintenance unit configured to perform maintenance on the ejection head; a drive part configured to moves the maintenance unit relative to the ejection head between a facing position facing the ejection head and a separation position away from the facing position in a driving direction by driving at least one drive target of the ejection head and the maintenance unit in the driving direction; and an imaging part configured to image an imaging range provided on a side of the separation position relative to the facing position in the driving direction, wherein the maintenance unit positioned at the facing position performs maintenance on the ejection head, the maintenance unit positioned at the separation position is away from the ejection head in the driving direction, the maintenance unit moves relative to the imaging range along with driving of the drive target by the drive part, and the imaging part images at least part of the maintenance unit which overlaps the imaging range in accordance with the driving of the drive target by the drive part, to thereby acquire a unit image.

A printing method according to the invention, comprises: performing maintenance on an ejection head having a nozzle ejecting ink, by a maintenance unit positioned at a facing position facing the ejection head; performing a printing operation of ejecting ink onto a base material from the nozzle by the ejection head while causing the maintenance to be positioned at a separation position away from the facing position in a driving direction of the maintenance unit; and imaging an imaging range provided on a side of the separation position relative to the facing position in the driving direction, by an imaging part, wherein the imaging part images at least part of the maintenance unit which overlaps the imaging range, to thereby acquire a unit image.

In the present invention (the printer and the printing method) having such a configuration, at least one of the ejection head and the maintenance unit is configured to be movable in the driving direction, and the maintenance unit relatively moves between the facing position facing the ejection head and the separation position away from the ejection head in the driving direction. Further, the imaging part is provided, configured to image the imaging range provided on the side of the separation position relative to the facing position in the driving direction, and the imaging part images at least part of the maintenance unit which overlaps the imaging range, to thereby acquire the unit image. Specifically, the unit image representing the condition of the maintenance unit can be acquired by the imaging part. Thus, it is possible to acquire the condition of the maintenance unit for performing maintenance on the ejection head which ejects ink from the nozzle, without requiring operation of the operator.

The printer may be configured so that the imaging range is provided between the facing position and the separation position in the driving direction. In such a configuration, the imaging range is provided in a movable range of the maintenance unit driven by the drive part, i.e., between the facing position and the separation position. For this reason, it is not necessary to provide a mechanism for moving the maintenance unit to the imaging range separate from the drive part and this is rational.

The printer may be configured so that the imaging part images the maintenance unit relatively passing through the imaging range along with the move between the facing position and the separation position. In such a configuration, the maintenance unit passing through the imaging range toward a move destination which is the facing position or the separation position is imaged. It is thereby possible to efficiently acquire the unit image by utilizing a period when the maintenance unit moves to the move destination.

The printer may be configured so that the drive part moves the maintenance unit from the facing position to the separation position before starting the printing operation, and the imaging part images the maintenance unit passing through the imaging range during moving from the facing position to the separation position. It is thereby possible to efficiently acquire the condition of the maintenance unit (the condition represented by the unit image) before starting the printing operation by utilizing the period when the maintenance unit moves to the separation position.

The printer may be configured so that the drive part moves the maintenance unit from the separation position to the facing position after ending the printing operation, and the imaging part images the maintenance unit passing through the image capture range during moving from the separation position to the facing position. It is thereby possible to efficiently acquire the condition of the maintenance unit (the condition represented by the unit image) after ending the printing operation by utilizing the period when the maintenance unit moves to the facing position.

The printer may further comprises: a display part configured to display the unit image acquired by the imaging part to an operator. In such a configuration, the operator can grasp the condition of the maintenance unit from the unit image displayed on the display part and easily determine whether or not the cleaning of the maintenance unit is needed.

The printer may further comprises: a base material transfer part configured to transfer the base material in a transfer direction, wherein a plurality of printing units each having the ejection head, the maintenance unit, the drive part, and the imaging part are arranged in the transfer direction, the plurality of printing units eject inks of respective different colors from the respective ejection heads onto the base material which is transferred by the base material transfer part, and the respective imaging parts of the plurality of printing units have respective different configurations in accordance with the respective colors of the inks which the printing units, to which the imaging parts belong respectively, eject from the respective ejection heads. In such a configuration, it is possible to acquire the unit image with an appropriate configuration in accordance with the color of the ink taken in the unit image.

The printer may be configured so that the imaging part in each of the plurality of printing units images the imaging range while emitting light to the imaging range, the light having a wavelength in accordance with the color of the ink which the printing unit, to which the imaging part belongs, ejects from the ejection head. In such a configuration, it is possible to vividly take the ink adhered/deposited on the maintenance unit onto the unit image.

The printer may be configured so that the imaging part has a filter making light having a predetermined wavelength selectively pass through the filter and an image sensor imaging the imaging range by detecting the light having emitted from the imaging range and passed through the filter, and the filter in each of the plurality of printing units makes light having a wavelength selectively pass through the filter, the wavelength in accordance with the color of the ink which the printing unit, to which the filter belongs, ejects from the ejection head. In such a configuration, it is possible to vividly take the ink adhered/deposited on the maintenance unit onto the unit image.

The printer may further comprises: a control part configured to analyze the unit image acquired by the imaging part. In such a configuration, it is possible to extract information included in the unit image by the analysis of the unit image.

The printer may be configured so that the control part obtains a condition of the maintenance unit on the basis of the unit image acquired by the imaging part. In such a configuration, the control part can check the condition of the maintenance unit, which is represented by the unit image.

The printer may be configured so that the control part obtains information on the ink adhered to the maintenance unit, on the basis of the unit image. In such a configuration, the control part can check the condition of the ink adhered/deposited on the maintenance unit, which is represented by the unit image.

The printer may be configured so that the control part obtains a position to which the ink is adhered in the maintenance unit, on the basis of the unit image. In such a configuration, the control part can check the adhesion position of the ink, which is represented by the unit image.

The printer may be configured so that the control part obtains a thickness of the ink deposited on the maintenance unit, on the basis of the unit image. In such a configuration, the control part can check the thickness of the ink which is represented by the unit image.

The printer may be configured so that the control part stores a size of a reference member included in the maintenance unit as a reference size and obtains the thickness of the ink deposited on the maintenance unit on the basis of a size ratio between the reference member and the ink, which are included in the unit image, and the reference size. In such a configuration, it is possible to easily obtain the thickness of the ink by a comparison with the reference size of the reference member.

The printer may be configured so that the control part obtains the thickness of the ink deposited on the maintenance unit on the basis of a plurality of unit images acquired by imaging the ink deposited on the maintenance unit from different directions respectively. In such a configuration, it is possible to accurately obtain the thickness of the ink from the disparity of the plurality of unit images.

The printer may be configured so that the control part obtains information on the degree of drying of the maintenance unit on the basis of the unit image acquired by the imaging part. In such a configuration, when it is determined that drying of the maintenance unit progresses, it is possible to perform procedures appropriate, such as moistening of the maintenance unit by the ink ejected from the ejection head, or the like.

The printer may be configured so that the control part stores a reference image obtained by imaging the maintenance unit in a predetermined condition by the imaging part and obtains a condition of the maintenance unit on the basis of a comparison between the unit image and the reference image. In such a configuration, the control part can check the change in the condition of the maintenance unit on the basis of the comparison between the unit image and the reference image.

The printer may be configured so that the predetermined condition is a condition in which the maintenance unit is an unused new one or a condition in which the maintenance unit has been cleaned in the maintenance. In such a configuration, the control part can check the change in the condition of the maintenance unit from a clean condition.

The printer may be configured so that the imaging part images ink which the ejection head ejects onto the maintenance unit from the nozzle, to thereby acquire the unit image, and the control part obtains a condition of the nozzle of the ejection head. In such a configuration, the control part can accurately check an ejection failure of the nozzle, or the like.

The printer may be configured so that the control part obtains a three-dimensional shape of a target included in the unit image on the basis of a plurality of unit images acquired by the imaging part in states where the maintenance unit is positioned at different positions in the driving direction. In such a configuration, the control part can accurately obtain the three-dimensional shape of the target on the basis of the disparity of the plurality of unit images.

The printer may be configured so that the imaging part has a plurality of cameras imaging the imaging range from respective different directions, and the control part obtains a three-dimensional shape of a target included in the unit image on the basis of the unit image acquired by each of the plurality of cameras. In such a configuration, it is possible to accurately obtain the three-dimensional shape of the target on the basis of the disparity of the plurality of unit images imaged by the plurality of cameras.

The printer may be configured so that the control part accumulates the unit image while associating the unit image with history information on a history of the printing operation which was performed by the ejection head until the unit image is acquired. The unit images accumulated, being associated thus with the history information, are useful to analyze the correlation relation between the history of the printing operation and the condition represented by the unit image.

The printer may be configured so that the control part obtains a variable having a correlation in the change of the condition of the maintenance unit along with execution of the printing operation, on the basis of a result of accumulating the unit image and the history information. In such a configuration, it becomes possible to determine whether or not cleaning of the maintenance unit is needed, on the basis of a value of the variable.

The printer may be configured so that the control part obtains a timing of performing cleaning of the maintenance unit on the basis of the variable. In such a configuration, it is possible to accurately obtain a cleaning timing of the maintenance unit.

The printer may be configured so that the control part generates training data for machine learning from the unit image. In such a configuration, it is possible to easily generate the training data.

The printer may be configured so that the imaging part has a plurality of lightings emitting light to the imaging range from respective different directions, and the lighting which emits light to the maintenance unit moving in an outward way from the facing position toward the separation position and the lighting which emits light to the maintenance unit moving in a return way from the separation position toward the facing position are different from each other. In such a configuration, the imaging part can image the maintenance unit passing through the imaging range, while emitting light from the different directions between the outward way and the return way of the maintenance unit which reciprocates between the facing position and the separation position.

It is thereby possible to acquire the conditions of different portions of the maintenance unit.

Advantageous Effects of Invention

Thus, according to the present invention, it becomes possible to acquire the condition of the maintenance unit for performing maintenance on the ejection head which ejects ink from the nozzle, without requiring operation of the operator.

BRIEF DESCRIPTION OF DRAWINGS

FIG. 9 is a table schematically showing one example of history information;

DESCRIPTION OF EMBODIMENTS

Figure 1:
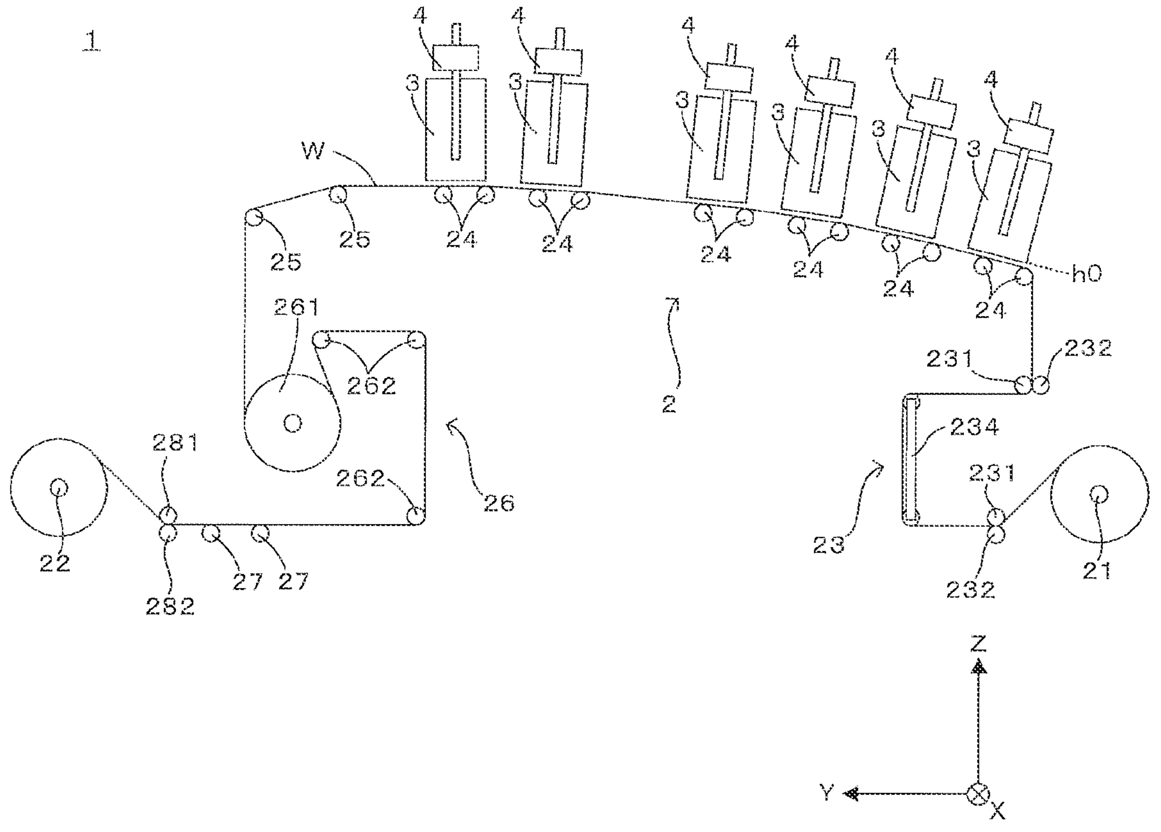
FIG. 1 is an elevational view schematically showing one example of a printer in accordance with the present invention.
Figure 2:
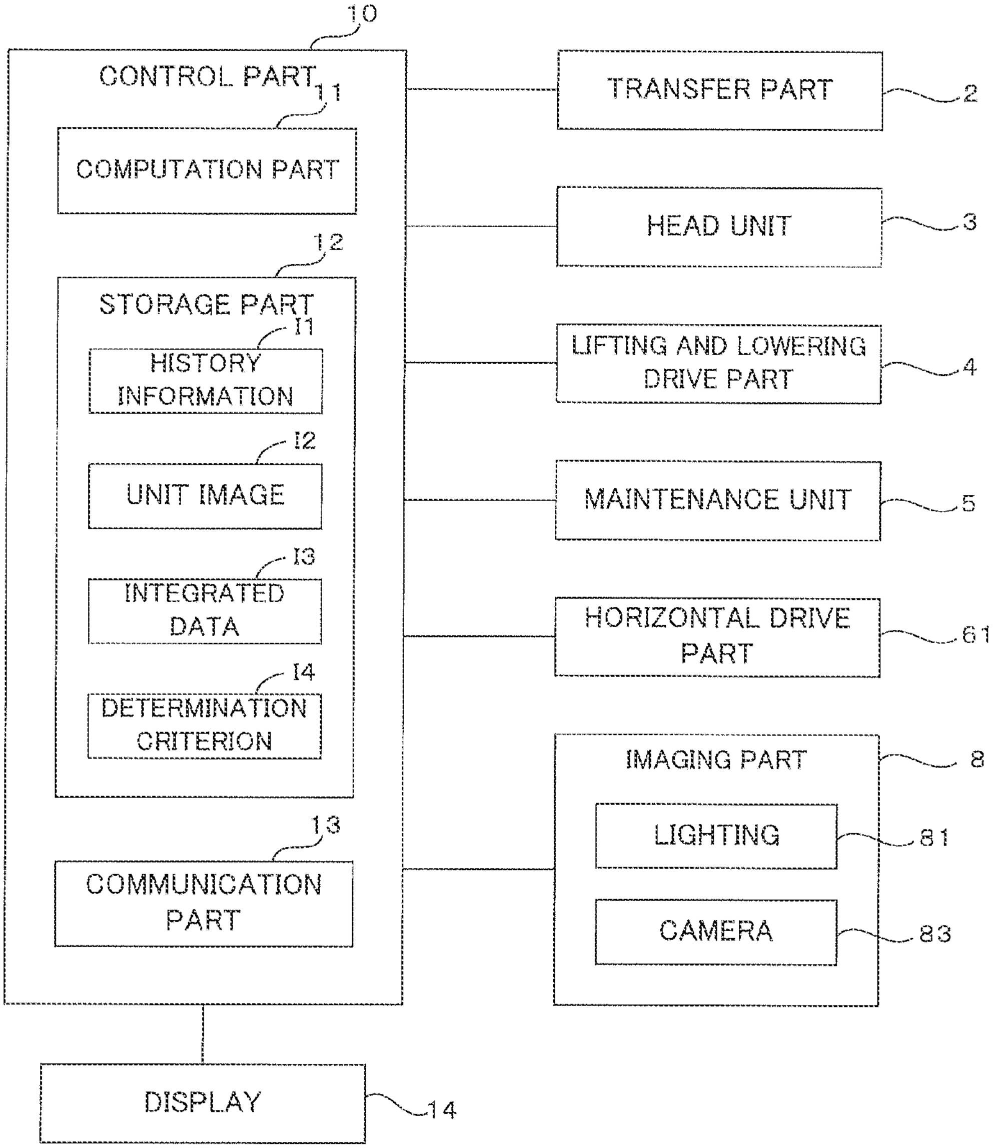
FIG. 2 is a block diagram showing an electrical configuration included in the printer of FIG. 1.

FIG. 1 is an elevational view schematically showing one example of a printer in accordance with the present invention, and FIG. 2 is a block diagram showing an electrical configuration included in the printer of FIG. 1. In FIG. 1 and the following figures, an X direction which is a horizontal direction, a Y direction which is a horizontal direction orthogonal to the X direction, and a Z direction which is a vertical direction are shown as appropriate. A printer 1 ejects ink onto a long strip-like web W by an inkjet method, to thereby print an image on the web W while transferring the web W in a roll-to-roll manner. The material of the web W is paper or a film and the web W has flexibility. The printer 1 includes a control part 10 for generally controlling the whole apparatus, and the control required to perform printing is performed by the control part 10.

The control part 10 is a computer having a computation part 11, a storage part 12, and a communication part 13. The computation part 11 is formed of a processor such as a CPU (Central Processing Unit) or the like, and performs an arithmetic operation required for printing. The storage part 12 is a memory device such as an HDD (Hard Disk Drive), an SSD (Solid State Drive), or the like, and stores therein data required for printing, data acquired along with the printing, or the like. The communication part 13 performs communication with an external apparatus such as an external computer or the like.

Further, the printer 1 includes a display 14 formed of, for example, an LCD monitor or the like, and the control part 10 displays information on the display 14 to give this information to an operator. This display 14 is formed of a touch panel and has a function of receiving an input operation of the operator. The information inputted to the display 14 by the operator is transmitted to the control part 10 and used for the control by the control part 10. Furthermore, an input function may be implemented by an input device such as a keyboard, a mouse, or the like, which is provided separately from the display 14.

The printer 1 includes a transfer part 2 for transferring the web W. The transfer part 2 has a feed-out roller 21 and a winding roller 22, and the web W fed out from the feed-out roller 21 is wound around the winding roller 22, to be thereby transferred in a roll-to-roll manner. This transfer part 2 incudes a take-in part 23 for taking in the web W fed out from the feed-out roller 21 between the feed-out roller 21 and the winding roller 22. The take-in part 23 has two driving rollers 231, two nip rollers 232, and an edge position adjustment part 234 provided between the two driving rollers 231. Each of the driving rollers 231 is rotated by a driving force of a motor while winding the web W, to thereby drive the web W. The two nip rollers 232 are provided corresponding to the two driving rollers 231, respectively, and each of the nip rollers 232 sandwiches the web W with the corresponding driving roller 231. The edge position adjustment part 234 adjusts the position of an end of the web W in the X direction which is a width direction of the web W.

Further, the transfer part 2 has a plurality of support rollers 24 for supporting the web W between the take-in part 23 and the winding roller 22. These support rollers 24 transfer the web W in the Y direction while supporting the web W from below, onto which ink is ejected by an inkjet method. Especially, the plurality of support rollers 24 are arranged, being inclined so that the support roller 24 positioned on the more downstream side in a transfer direction (Y direction) of the web W should be positioned higher. Therefore, the web W transferred by these support rollers 24 is transferred inclinedly so as to ascend as goes toward the Y direction.

Further, the transfer part 2 has a plurality of support rollers 25 for supporting the web W between these support rollers 24 and the winding roller 22 and a drying part 26 disposed between these support rollers 25 and the winding roller 22. The drying part 26 has a heat drum 261 and support rollers 262 for supporting the web W going from the heat drum 261 toward the winding roller 22. The heat drum 261 is rotationally driven in response to the transfer of the web W, and dries the web W by heating the web W with an incorporated heater. Furthermore, the transfer part 2 has a plurality of support rollers 27 for supporting the web W going from the drying part 26 toward the winding roller 22. Moreover, the transfer part 2 has a driving roller 281 and a nip roller 282 arranged between these support rollers 27 and the winding roller 22. The driving roller 281 is rotated by the driving force of the motor while winding the web W, to thereby drive the web W. The nip roller 282 sandwiches the web W with the driving roller 281.

Figure 3:
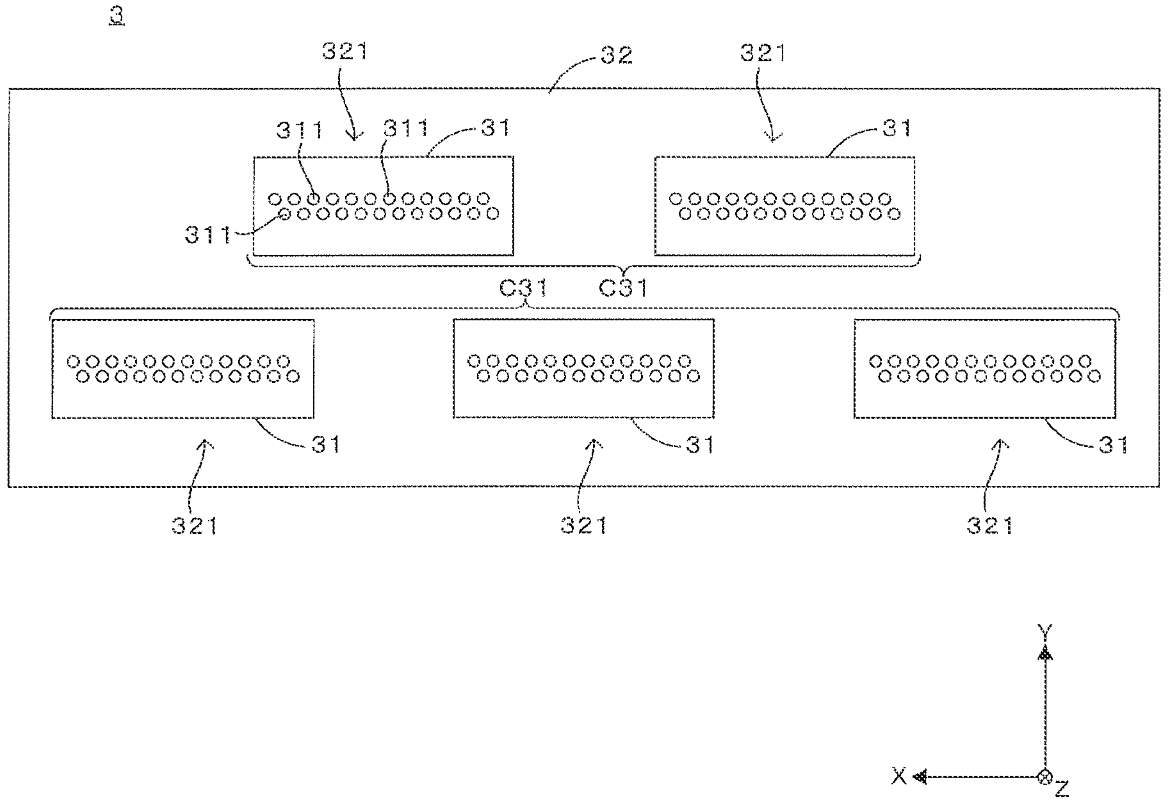
FIG. 3 is a bottom view schematically showing a configuration of a head unit.

The printer 1 has a plurality of (six) head units 3 (FIG. 3) facing the web W supported by the plurality of support rollers 24, from above. FIG. 3 is a bottom view schematically showing a configuration of the head unit. The head unit 3 has a plurality of (five) ejection heads 31. The plurality of ejection heads 31 are arranged in a two-row staggered manner in the X direction, and in other words, a head row C31 consisting of three head units 3 arranged in parallel to the X direction and a head row C31 consisting of two head units 3 arranged in parallel to the X direction are provided in the Y direction. In each of the ejection heads 31, a plurality of nozzles 311 are arranged in a staggered manner in the X direction, facing the web W from above, and each of the nozzles 311 ejects ink onto the web W by an inkjet method. This head unit 3 has a head holding member 32 that holds each ejection head 31. The head holding member 32 has a plurality of head insertion holes 321 provided corresponding to the plurality of ejection heads 31, respectively, and each of the plurality of ejection heads 31 is fixed to the head holding member 32, being inserted into the corresponding head insertion hole 321. The head holding member 32 is formed of an inelastic member such as a metal or a resin.

As shown in FIG. 1, in accordance with the tilt of the web W supported by the plurality of support rollers 24, a posture of each of the plurality of head units 3 is set. In other words, each head unit 3 is disposed so that the head unit 3 positioned on the more upstream side in the transfer direction of the web W among the plurality of head units 3 should have a larger tilt with respect to the Z direction. The head unit 3 positioned on the downmost-stream side in the transfer direction (Y direction) of the web W, however, is disposed horizontally, not being inclined with respect to the Z direction, and the head units 3 other than the head unit 3 on the downmost-stream side are inclined so as to become higher toward the transfer direction of the web W. Further, the tilt of the head unit 3 can be evaluated by an angle at which a bottom surface of the head unit 3 including the nozzle 311 is formed with respect to the Z direction.

The plurality of head units 3 eject inks of respective different colors including yellow, magenta, cyan, and black from the respective nozzles 311 in response to a command from the control part 10. This makes it possible to print a color image on the web W. The number of head units 3 and the colors of the inks, however, are not limited to this exemplary case.

Further, the printer 1 includes a plurality of lifting and lowering drive parts 4 provided corresponding to the plurality of head units 3, respectively. Each of the plurality of lifting and lowering drive parts 4 lifts and lowers the corresponding head unit 3 in response to the command from the control part 10, to thereby position the head unit 3 to any one of a plurality of positions with respective different heights. In FIG. 1, each head unit 3 is positioned at a print height h0 closest to the web W. The lifting and lowering drive part 4 can be implemented with a well-known specific structure, and for example, can be configured to lift or lower the head unit 3 by driving a ball screw, an eccentric cam, or the like by the motor.

Furthermore, the printer 1 includes a maintenance unit 5 (FIG. 4) configured to perform maintenance on the head unit 3 and a horizontal drive part 61 configured to drive the maintenance unit 5 in a horizontal direction (X direction). The maintenance unit 5 and the horizontal drive part 61 are provided for each of the plurality of head units 3. This maintenance unit 5 is moved by the horizontal drive part 61 in the X direction which is a cleaning direction, to thereby perform a wipe described later on the head unit 3. The maintenance unit 5 and the horizontal drive part 61 are provided for each of the plurality of head units 3. The horizontal drive part 61 can include, for example, a rail extending in the X direction and supporting the maintenance unit 5 and a linear motor driving the maintenance unit 5 in the X direction. Further, instead of the linear motor, a mechanism for rotating a pulley around which a belt attached to the maintenance unit 5 is wound, by the motor, or a ball screw for linearly moving the maintenance unit 5 may be used. Subsequently, details of the maintenance unit 5 will be described.

Figure 4:
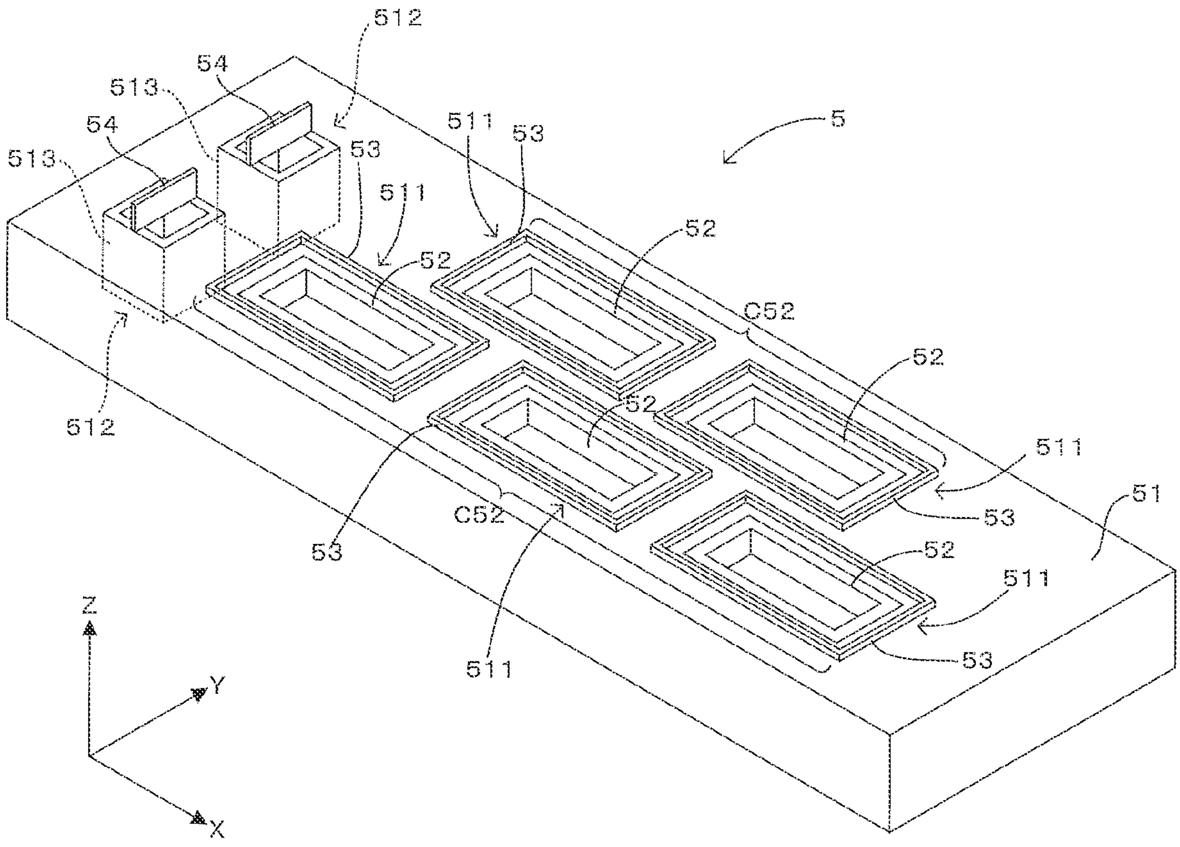
FIG. 4 is a perspective view schematically showing a configuration of a maintenance unit.

FIG. 4 is a perspective view schematically showing a configuration of the maintenance unit. As described above, the maintenance unit 5 is provided for each of the plurality of head units 3 and each maintenance unit 5 faces the corresponding head unit 3 from below. The maintenance unit 5 is disposed, being inclined in accordance with the tilt of the head unit 3. Since the tilt of the maintenance unit 5 is very small, however, the tilt of the maintenance unit 5 is not reflected in FIG. 4 and the following figures. Further, since a plurality of maintenance units 5 provided corresponding to the plurality of head units 3 have a common configuration, description will be made on one maintenance unit 5.

The maintenance unit 5 has a base member 51 having a rectangular parallelepiped shape elongated in the X direction, and the horizontal drive part 61 (FIG. 2) drives the base member 51 in the X direction while supporting the base member 51. This base member 51 is provided with a cap insertion hole 511 which has a rectangular parallelepiped shape elongated in the X direction and is opened upward. The maintenance unit 5 has a plurality of cap insertion holes 511 corresponding to the plurality of ejection heads 31 in the head unit 3 facing the maintenance unit 5. Thus, the plurality of cap insertion holes 511 are arranged in a two-row staggered manner in the X direction.

Further, the maintenance unit 5 has a cap 52 fitted into each of the plurality of cap insertion holes 511. Thus, the maintenance unit 5 has a plurality of caps 52 corresponding to the plurality of ejection heads 31 in the head unit 3 facing the maintenance unit 5, and each of the plurality of caps 52 faces the corresponding ejection head 31 from below and receives the ink dropping from the ejection head 31. The plurality of caps 52 are arranged in a two-row staggered manner in the X direction, and in other words, a cap row C52 consisting of three caps 52 arranged in parallel to the X direction and a cap row C52 consisting of two caps 52 arranged in parallel to the X direction are provided in the Y direction.

The maintenance unit 5 has a seal member 53 disposed on an upper surface of the base member 51. The seal member 53 is a frame body having a rectangular shape in a plan view from the Z direction and provided for each of the plurality of caps 52. This seal member 53 protrudes by a predetermined height from the upper surface of the base member 51 and surrounds the corresponding cap 52 from the outside in a plan view. This seal member 53 is formed of an elastic member such as rubber, silicone, or the like, and is elastically deformed in response to an external force. Further, a similar seal member may be provided along a flat edge portion of the base member 51.

Furthermore, the maintenance unit 5 has a wiper 54 formed of an elastic member such as rubber, silicone, or the like which is elastically deformed. The wiper 54 is a blade having a flat plate-like shape extending in parallel to the Y direction and stands from the upper surface of the base member 51. The wiper 54 is provided corresponding to each of the plurality of (two of) the cap rows C52, and each wiper 54 is disposed on the upstream side in the X direction (cleaning direction) of the corresponding cap row C52. Thus, at an upstream end of the base member 51 in the X direction, a plurality of (two) wipers 54 are arranged in the Y direction. Each wiper 54 scrape off the ink from the ejection head 31, as described later.

Further, the maintenance unit 5 has a tank mounting part 512 provided for each of the plurality of wipers 54. This tank mounting part 512 is a hole formed on the base member 51 and opened upward, and positioned below the corresponding wiper 54, and a waste liquid container 513 is inserted into each tank mounting part 512. Thus, the waste liquid container 513 is provided below each of the plurality of wipers 54. Each waste liquid container 513 is a box-like tank opened upward and faces the corresponding wiper 54 from below. The waste liquid container 513 stores therein the ink scraped off by the wiper 54 and dropping from the wiper 54. Furthermore, the waste liquid container 513 does not necessarily need to be a box but may be a pan for receiving the ink.

Figure 5:
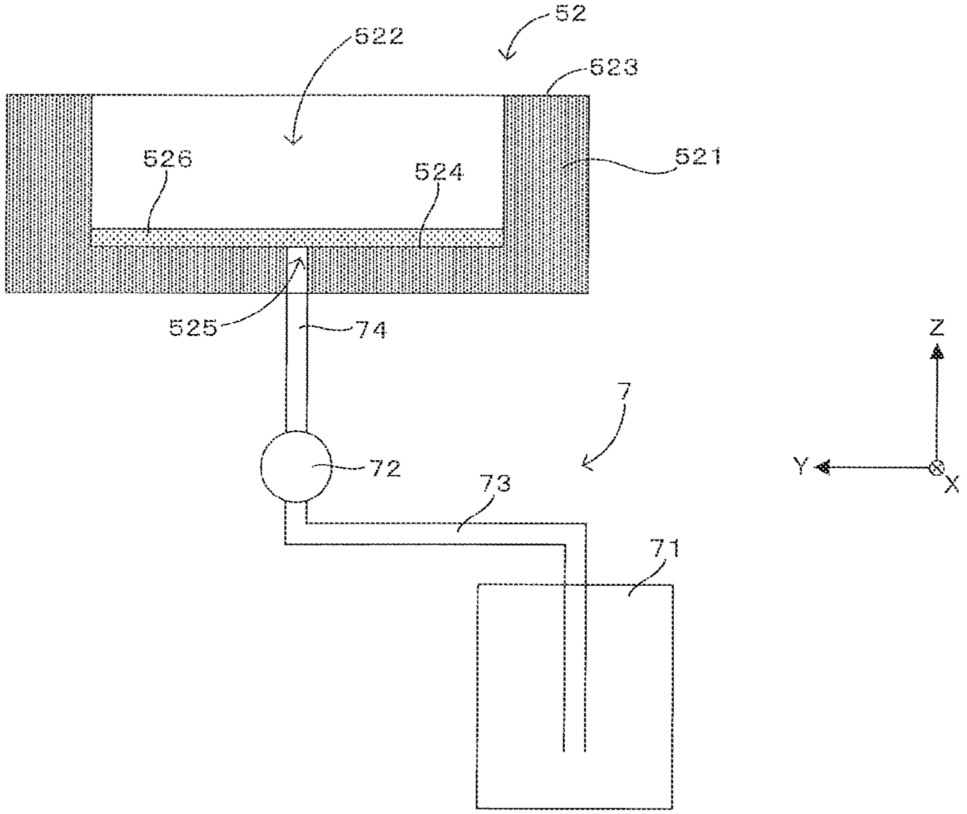
FIG. 5 is a view schematically showing a cross section of a cap and an ink discharge unit connected to the cap.

FIG. 5 is a view schematically showing a cross section of the cap and an ink discharge unit connected to the cap. The cap 52 has a cap main body 521 having a rectangular parallelepiped shape elongated in the X direction. The cap main body 521 is formed of a resin and has a nature of being harder to be elastically deformed, as compared with the above-described elastic member. The cap main body 521 is provided with a recessed portion 522 opened upward. The recessed portion 522 has a rectangular parallelepiped shape and an upper surface 523 of the cap main body 521 surrounding the recessed portion 522 is a plane. A bottom surface 524 of the recessed portion 522 has a planar shape. In the bottom surface 524, opened is an exhaust port 525 penetrating the cap main body 521 in the Z direction. Further, on the bottom surface 524 of the recessed portion 522, placed is an ink absorbing member 526 formed of a sponge or the like.

Further, as shown in FIG. 5, the printer 1 includes an ink discharge unit 7 configured to discharge the ink from the recessed portion 522 of the cap 52. The ink discharge unit 7 has a waste liquid container 71, a pump 72, a pipe 73 connecting the waste liquid container 71 and the pump 72 to each other, and a flexible pipe 74 connecting the exhaust port 525 and the pump 72 to each other. Therefore, by exhausting the exhaust port 525 by the pump 72, the ink adhered on the ink absorbing member 526 is discarded through the exhaust port 525 into the waste liquid container 71. The waste liquid container 71, the pump 72, and the pipe 73 are provided common to the plurality of (five) caps 52 in the maintenance unit and the pipes 74 provided for the plurality of caps 52, respectively, are connected to the pump 72. There may be a configuration, however, where the ink discharge unit 7 is provided for each of the plurality of caps 52.

Figure 6A:
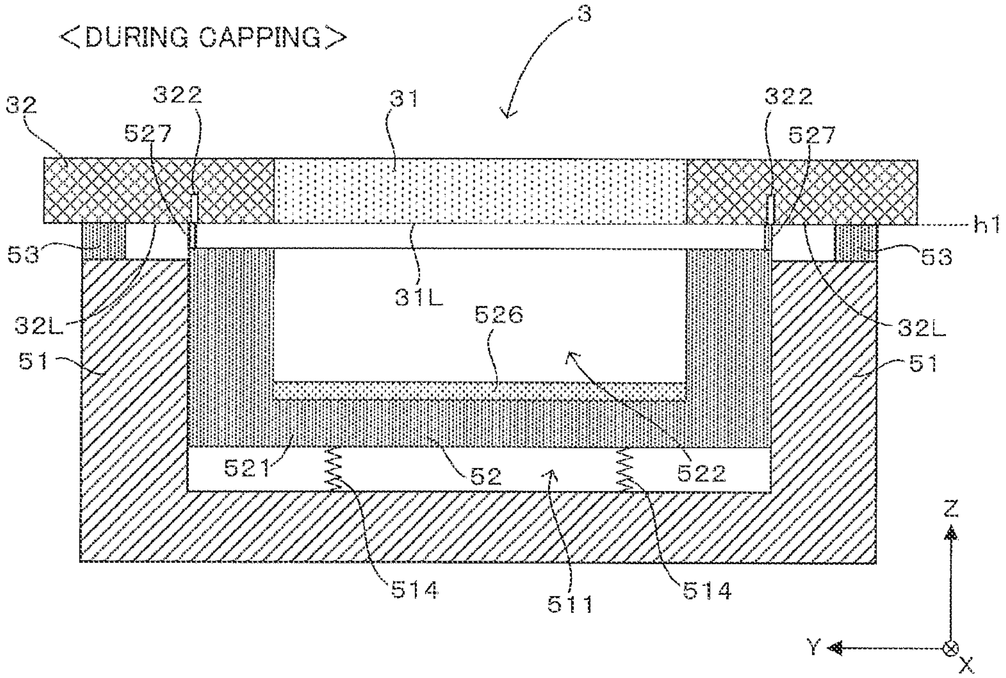
FIG. 6A is a partial sectional view schematically showing an execution mode of capping by the maintenance unit.
Figure 6B:
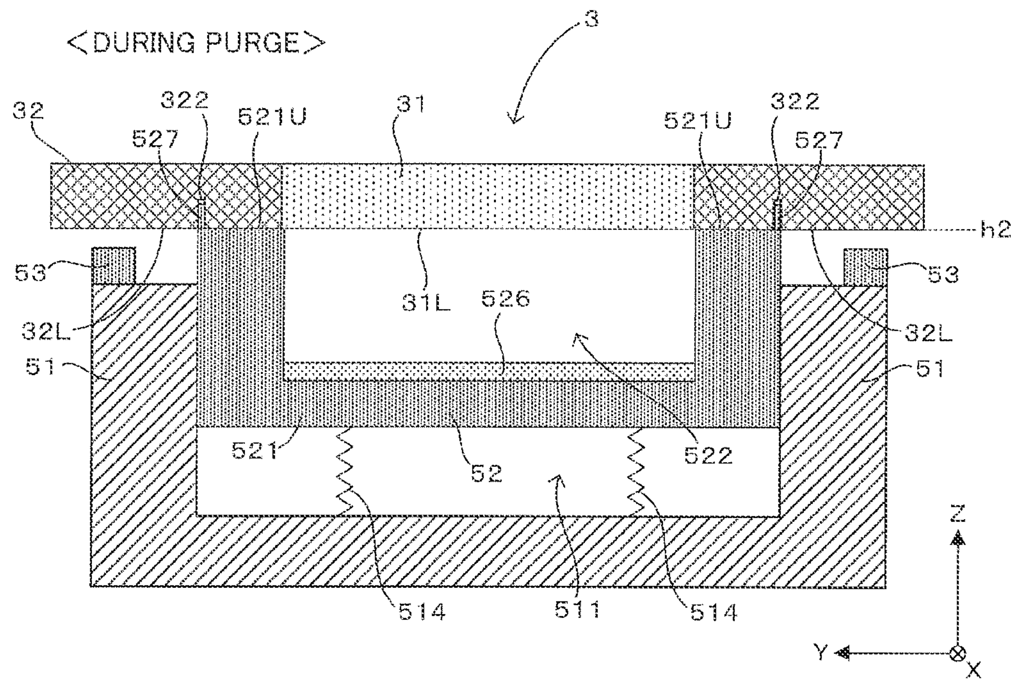
FIG. 6B is a partial sectional view schematically showing an execution mode of purge by the maintenance unit.
Figure 6C:
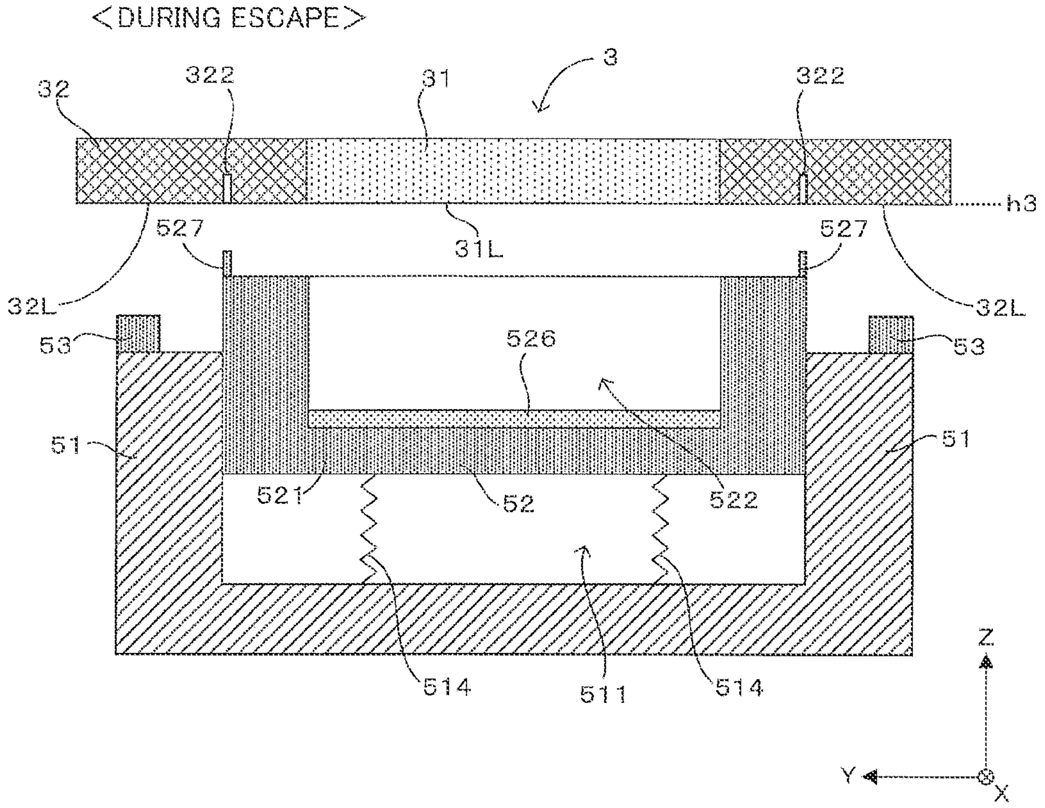
FIG. 6C is a partial sectional view schematically showing an execution mode of move by the maintenance unit.

FIG. 6A is a partial sectional view schematically showing an execution mode of capping by the maintenance unit, FIG. 6B is a partial sectional view schematically showing an execution mode of purge by the maintenance unit, and FIG. 6C is a partial sectional view schematically showing an execution mode of move by the maintenance unit.

As described above, the lifting and lowering drive part 4 lifts and lowers the head unit 3. The head unit 3 can be thereby positioned, with a bottom height thereof as reference, at any one of the print height h0 (FIG. 1), a capping height h1 (FIG. 6A) higher than the print height h0, a purge height h2 (FIG. 6B) higher than the capping height h1, and an escape height h3 (FIG. 6C) higher than the purge height h2. Further, as shown in FIGS. 6A to 6C, a bottom surface 31L of the ejection head 31 and a bottom surface 32L of the head holding member 32 are each a plane and aligned flush with each other. Further, the heights h1 to h3 of the head unit 3 are indicated by the height of the bottom surfaces 31L and 32L (in other words, the bottom surface of the head unit 3).

When the head unit 3 is positioned at any one of the heights h1 to h3, the maintenance unit 5 can be positioned between the head unit 3 and the web W. On the other hand, when the head unit 3 is positioned at the print height h0, the maintenance unit 5 cannot be positioned between the head unit 3 and the web W. For this reason, a horizontal drive part 9 causes the maintenance unit 5 to escape toward the X direction relative to the web W.

As shown in these figures, in the bottom surface 32L of the head holding member 32, formed is a positioning hole 322 which extends in the Z direction and is opened downward. The positioning protrusion 527 of the cap 52 is insertable and removable into/from this positioning hole 322 from below, and four positioning holes 322 are provided corresponding to the four positioning protrusions 527 provided at four corners. This positioning hole 322 is longer than the positioning protrusion 527. Further, the cap 52 is liftable and lowerable relative to the cap insertion hole 511 of the base member 51 in the Z direction. Between the bottom surface of the cap 52 and the bottom surface of the cap insertion hole 511, provided is a compressed spring 514 (biasing member), and the cap 52 is biased upward relative to the base member 51 by the compressed spring 514.

During the capping shown in FIG. 6A, the plurality of caps 52 in the maintenance unit 5 face the plurality of ejection heads 31 in the head unit 3 from below, respectively. The head unit 3 is positioned at the capping height h1, and the bottom surface 32L of the head holding member 32 in the head unit 3 comes into contact with the seal member 53 from above. The seal member 53 is elastically deformed in accordance with the shape of the bottom surface 32L of the head holding member 32 with which the seal member 53 is in contact, to thereby come into close contact with the bottom surface 32L. The clearance between the bottom surface 32L of the head holding member 32 and the seal member 53 thereby disappears, and the bottom surface 31L of the ejection head 31 existing inside the seal member 53 in a bottom view and the nozzle 311 are sealed by the seal member 53. Thus, the seal member 53 in close contact with the head unit 3 blocks an air flow between inside and outside the seal member 53 and isolates the nozzle 311 inside the seal member 53 from the atmosphere outside the seal member 53. In other words, the ejection head 31 is positioned inside the seal member 53 in a bottom view and blocked from the outside air by the seal member 53 in close contact with the head unit 3. This moisturizes the nozzle 311 of the ejection head 31.

During the capping shown in FIG. 6A, the position of the positioning protrusion 527 and the position of the positioning hole 322 are slightly deviated from each other in the Y direction, and therefore the positioning protrusion 527 is not fitted into the positioning hole 322. Such a positional relation between the positioning protrusion 527 and the positioning hole 322 can be achieved by adjusting the position of the cap 52 by the horizontal drive part 9. As a result, an upper end of the positioning protrusion 527 is pressed onto the bottom surface of the head holding member 32 at the capping height h1 from below by a biasing force of the compressed spring 514. Therefore, the cap main body 521 is positioned lower than the bottom surface 32L of the head holding member 32 by the length of the positioning protrusion 527.

During the purge shown in FIG. 6B, the plurality of caps 52 in the maintenance unit face the plurality of ejection heads 31 in the head unit 3 from below, respectively. The head unit 3 is positioned at the purge height h2 and separated upward from the seal member 53. The position of the positioning protrusion 527 and the position of the positioning hole 322 coincide with each other and the positioning protrusion 527 is fitted into the positioning hole 322 from below. As a result, the cap main body 521 of the cap 52 gets closer to the head unit 3, as compared with during the capping shown in FIG. 6A, and an upper surface 521U of the cap main body 521 of the cap 52 comes into contact with the bottom surface 32L of the head holding member 32. Since the cap main body 521 of the cap 52 is formed of a resin, the cap main body 521 is not elastically deformed, unlike the seal member 53. Therefore, in the state where the upper surface 521U of the cap main body 521 is in contact with the bottom surface 32L of the head holding member 32, there is a very small clearance between the upper surface 521U of the cap main body 521 and the bottom surface 32L of the head holding member 32. In other words, the cap 52 in contact with the head holding member 32 allows an air flow between inside and outside the cap 52 through this clearance. When the purge is performed in order to prevent clogging of the nozzle 311 of the ejection head 31, the control part 10 causes the head unit 3 and the maintenance unit 5 to perform an operation shown in FIG. 6B. The purge is performed by giving a pressure to the ink stored inside the ejection head 31 and draining the ink from the nozzle 311 for a predetermined time. On the other hand, the ink absorbing member 526 inside the recessed portion 522 of the cap 52, which is in contact with the head holding member 32, faces the ejection head 31 from below and receives the ink drained from the nozzle 311 of the ejection head 31. Thus, the ink received by the ink absorbing member 526 is collected by the waste liquid container 71.

During the escape shown in FIG. 6C, the head unit 3 is positioned at the escape height h3. The escape height h3 is higher than a peak up to which the positioning protrusion 527 can be elevated by a biasing force of the compressed spring 66, and the head unit 3 is separated from the positioning protrusion 527 in the Z direction. As a matter of course, the head unit 3 is also separated from the cap 52 and the seal member 53 in the Z direction.

Figure 7:
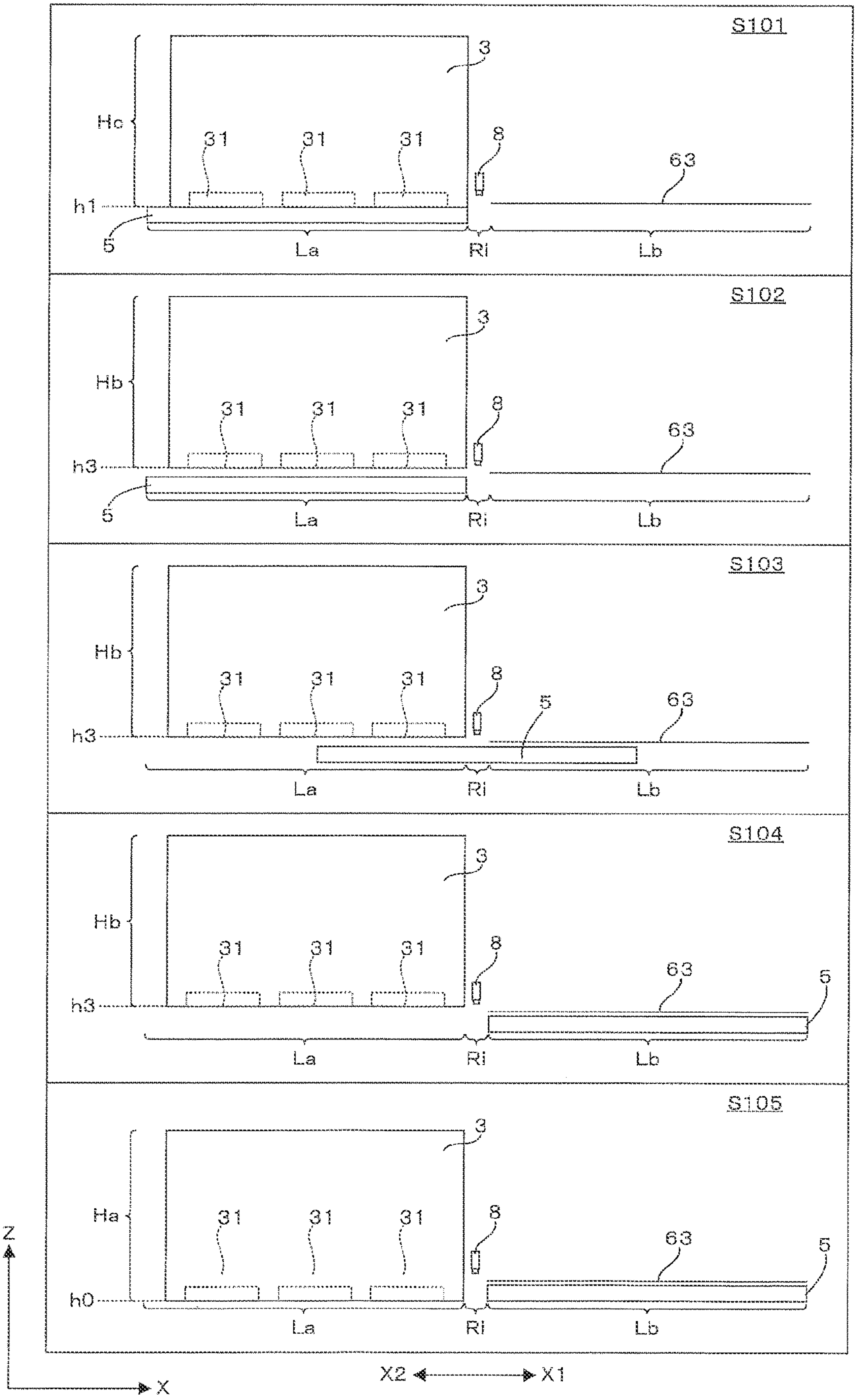
FIG. 7 is a view schematically showing an operation of the maintenance unit.

FIG. 7 is a view schematically showing an operation of the maintenance unit. The maintenance unit 5 is a member for capping a lower surface of the head unit 3 and protecting it from the outer atmosphere during a suspension period of the printing operation. In the present embodiment, when the operator instructs the control part 10 to start the printing operation through the display 14, the control part 10 moves the maintenance unit 5 from the facing position La toward the separation position Lb. Further, when the operator instructs the control part 10 to end the printing operation through the display 14, the control part 10 moves the maintenance unit 5 from the separation position Lb toward the facing position La. In the course while the maintenance unit 5 moves between the facing position La and the separation position Lb, an imaging part 8 (described later) images the maintenance unit 5.

Further, FIG. 7 shows one side X1 and the other side X2 in the X direction. Herein, the one side X1 and the other side X2 face in opposite directions to each other. As described above, the maintenance unit 5 receives a driving force from the horizontal drive part 61 and thereby moves in the X direction. Especially, as shown in FIG. 7, for the maintenance unit 5, the facing position La and the separation position Lb which are different from each other in the X direction are provided, and the maintenance unit 5 moves between the facing position La and the separation position Lb. Herein, the facing position La is a position facing the head unit 3 and the separation position Lb is a position provided with an interval from the facing position La in the X direction. In other words, in a plan view, the head unit 3 and the separation position Lb are aligned with an interval in the X direction.

In a case where the maintenance unit 5 is positioned at the facing position La, the maintenance unit 5 faces the head unit 3 from below and the plurality of caps 52 in the maintenance unit 5 face the plurality of ejection heads 31 in the head unit 3, respectively, from below. On the other hand, in a case where the maintenance unit 5 is positioned at the separation position Lb, the maintenance unit 5 escapes from the head unit 3 in the X direction. Specifically, in a plan view, the maintenance unit 5 is positioned on one side X1 in the X direction of the head unit 3 and does not overlap the head unit 3.

Further, the printer 1 includes a cover member 63 having a planar shape, which is provided for the separation position Lb. The cover member 63 and the head unit 3 are aligned with an interval in the X direction, and the cover member 63 faces the maintenance unit 5 positioned at the separation position Lb, from above, to thereby cover the maintenance unit 5. Furthermore, in a case where a large amount of inks are adhered to the maintenance unit 5, a cleaning operation is performed on the maintenance unit 5 by the operator. This cleaning operation is performed, for example, in a state where while the maintenance unit 5 is exposed with the cover member 63 removed while the maintenance unit 5 is positioned at the separation position Lb.

Further, as described above, the head unit 3 receives a driving force from the lifting and lowering drive part 4, to be thereby lifted or lowered. Specifically, as shown in FIG. 7, the head unit 3 is lifted and lowered among a print position Ha, an escape position Hb, and a capping position Hc which are different from one another in the Z direction. Herein, the print position Ha is positioned at the print height h0, the escape position Hb is positioned at the escape height H3, and the capping position Hc is positioned at the capping height Hl. In other words, the print position Ha is a position close to the web W, the escape position Hb is a position away from the web W relative to the print position Ha, and the capping position Hc is a position away from the web W relative to the print position Ha and closer to the web W relative to the escape position Hb.

Figure 8:
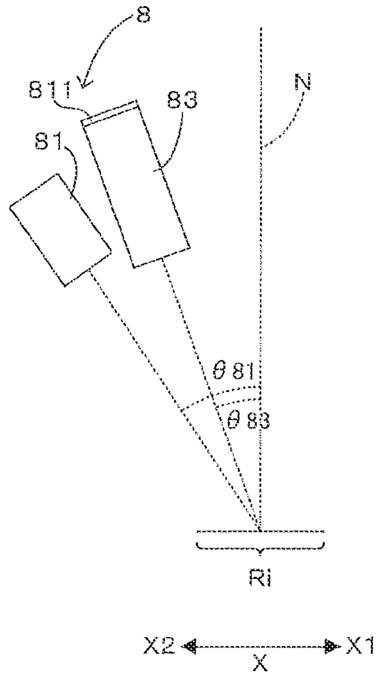
FIG. 8 is a view schematically showing a first example of a configuration of an imaging part.

Furthermore, the printer 1 includes an imaging part 8 configured to image an imaging range Ri provided between the facing position La and the separation position Lb in the X direction, from above (FIG. 8). The imaging part 8 is provided for each of the plurality of head units 3. FIG. 8 is a view schematically showing a first example of a configuration of the imaging part. The imaging part 8 faces the imaging range Ri through the space between the head unit 3 and the cover member 63. This imaging part 8 has a lighting 81 and a camera 83, and the camera 83 images the imaging range Ri while the lighting 81 emits light (e.g., white light) to the imaging range Ri. The camera 83 has an area sensor 811 formed of a solid-state image sensor such as a CCD (Charge Coupled Device) image sensor or the like, and the area sensor 811 detects light reflected by the imaging range Ri and the camera 83 thereby images the imaging range Ri.

The lighting 81 emits light to the imaging range Ri from diagonally above, being inclined toward the other side X2 by an angle θ81 with respect to a normal N perpendicular to the upper surface 521U of the cap 52, and the camera 83 images the imaging range Ri from diagonally above, being inclined toward the other side X2 by an angle θ83 with respect to the normal N. It is thereby possible to emit light to the respective side surfaces and upper surfaces of the cap 52 and the seal member 53 and image these members. Further, the direction to which the lighting 81 and the camera 83 are inclined with respect to the normal N is not limited to the other side X2 but may be the one side X1.

In a case where the printing operation is started, for example, Steps S101 to S105 shown in FIG. 7 are sequentially executed. In Step S101, the maintenance unit 5 is positioned at the facing position La and the head unit 3 is positioned at the capping position Hc. In this state, the plurality of seal members 53 in the maintenance unit 5 are in close contact with the head holding member 32 in the head unit 3, and each of the plurality of ejection heads 31 in the head unit 3 is covered with the corresponding cap 52 and seal member 53 (capping). It is thereby possible to suppress drying of the plurality of nozzles 311 included in each ejection head 31.

In Step S102, the head unit 3 moves to the escape position Hb and the plurality of seal members 53 in the maintenance unit 5 are away from the head holding member 32 in the head unit 3. Further, in Step S103, the maintenance unit 5 moves from the facing position La toward the separation position Lb, i.e., toward the one side X1. Then, along with the move of the maintenance unit 5 toward the one side X1, the wiper 54 in the maintenance unit 5 is slided to the ejection head 31 in the head unit 3 and the wiper 54 scrapes off the ink from the ejection head 31 (wipe).

Furthermore, in Step S103, the maintenance unit 5 moving from the facing position La to the separation position Lb passes through the imaging range Ri. Then, the imaging part 8 images the maintenance unit 5 passing through the imaging range Ri and transmits image data of the maintenance unit 5 to the control part 10 (imaging process).

When the maintenance unit 5 reaches the separation position Lb (Step S104), the head unit 3 is lowered from the escape position Hb to the print position Ha (Step S105). Then, the head unit 3 positioned at the print position Ha ejects ink onto the web W, to thereby perform printing on the web W (printing operation).

On the other hand, in a case where the printing operation is ended, a procedure reverse to the above-described one is performed. Specifically, immediately after the printing operation is ended, as shown in Step S105, the head unit 3 is positioned at the print position Ha, being close to the web W, and the maintenance unit 5 is positioned at the separation position Lb, being covered with the cover member 63.

Then, in Step S104, the head unit 3 is lifted from the print position Ha to the escape position Hb, and in Step S103, the maintenance unit 5 moves from the separation position Lb toward the facing position La, i.e., toward the other side X2. Further, in Step S103, along with the move of the maintenance unit 5 toward the other side X2, the wiper 54 in the maintenance unit 5 is slided to the ejection head 31 in the head unit 3 and the wiper 54 scrapes off the ink from the ejection head 31 (wipe).

Furthermore, in Step S103, the maintenance unit 5 moving from the separation position Lb to the facing position La passes through the imaging range Ri. Then, the imaging part 8 images the maintenance unit 5 passing through the imaging range Ri and transmits image data of the maintenance unit 5 to the control part 10 (imaging process).

When the maintenance unit 5 reaches the facing position La (Step S102), the head unit 3 is lowered from the escape position Hb to the capping position Hc (Step S101). As a result, each of the plurality of ejection heads 31 in the head unit 3 is covered with the corresponding cap 52 and seal member 53 (capping).

In the above-described printer 1, while the maintenance unit 5 is escaped to the separation position Lb, the head unit 3 positioned at the print position Ha ejects ink onto the web W, to thereby perform printing on the web W (printing operation). At that time, the control part 10 acquires history information I1 (FIG. 9) indicating a history of each operation performed in the printing operation and accumulates the history information I1 into the storage part 12.

FIG. 9 is a table schematically showing one example of the history information. As shown in FIG. 9, the history information I1 includes an apparatus ID for identifying the printer 1 which performed the printing operation, time when the printing operation was performed, the type of ink used in the printing operation, the type of web W used in the printing operation, a print distance where the printing operation was performed. Herein, as the type of ink, water-based ink, oil-based ink, UV (Ultraviolet) ink, or the like may be used, and as the type of web W, a film, coated paper, wood-free paper, or the like may be used. The print distance indicates the length of the web W which is an execution target of the printing operation.

Further, in the printer 1, along with the start or end of the printing operation, an imaging process is performed at a timing when the maintenance unit 5 moving in the X direction passes through the imaging range Ri (Step S103). Subsequently, this imaging process will be described.

Figure 10:
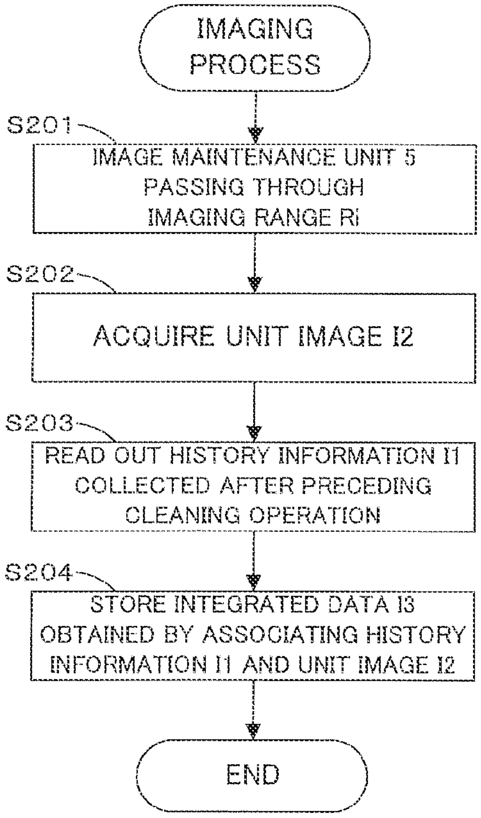
FIG. 10 is a flowchart showing one example of an imaging process.

FIG. 10 is a flowchart showing one example of the imaging process. In Step S201, by imaging the maintenance unit 5 passing through the imaging range Ri, the imaging part 8 acquires a unit image I2 which is image data representing at least part of the maintenance unit 5 which is included in the imaging range Ri and transmits the unit image I2 to the control part 10. The unit image I2 can be acquired in any one of various manners. For example, by imaging the imaging range Ri at a timing when a target portion, i.e., a periphery of the recessed portion 522 of the cap 52 or the seal member 53 in the maintenance unit 5, passes through the imaging range Ri, the unit image I2 representing the target portion can be acquired. Alternatively, by imaging the imaging range Ri every time when the maintenance unit 5 moves a width of the imaging range Ri in the X direction and connecting the pieces of image data acquired in the respective imagings, the unit image I2 representing the whole of the maintenance unit 5 can be acquired. As a matter of course, both the unit image I2 of each target portion of the maintenance unit 5 and the unit image I2 of the whole of the maintenance unit 5 may be acquired.

In Step S203, the computation part 11 reads out the history information I1 collected after the preceding cleaning operation (in other words, the cleaning operation performed most recently) from the storage part 12. Then, the computation part 11 generates integrated data 13 obtained by associating the history information I1 which are read out from the storage part 12 and the unit image I2 with each other and stores the integrated data 13 into the storage part 12 (Step S204). It is thereby possible to check a correspondence between the execution status (history information I1) of each operation performed in the printing operation after the cleaning operation and the unit image I2, by the integrated data 13.

In the above-described embodiment, the maintenance unit 5 is configured to be movable in the X direction (driving direction), and moves between the facing position La facing the ejection head 31 and the separation position Lb away from the ejection head 31 in the X direction. Further, provided is the imaging part 8 configured to image the imaging range Ri provided on the side of the separation position Lb relative to the facing position La in the X direction and the imaging part 8 images at least part of the maintenance unit 5 which overlaps the imaging range Ri to acquire the unit image I2. In other words, the unit image I2 representing the condition of the maintenance unit 5 can be acquired by the imaging part 8. Thus, it becomes possible to acquire the condition of the maintenance unit 5 for performing maintenance on the ejection head 31 which ejects ink from the nozzle 311 without requiring operation of the operator.

Further, the imaging range Ri is provided between the facing position La and the separation position Lb in the X direction. In other words, the imaging range Ri is provided in a movable range of the maintenance unit 5 driven by the horizontal drive part 61 (drive part) between the facing position La and the separation position Lb. For this reason, it is not necessary to provide a mechanism for moving the maintenance unit 5 to the imaging range Ri separate from the horizontal drive part 61 and this is rational.

Furthermore, the imaging part 8 images the maintenance unit 5 relatively passing through the imaging range Ri along with the move of the maintenance unit 5 between the facing position La and the separation position Lb. In other words, the maintenance unit 5 passing through the imaging range Ri toward a move destination such as the facing position La or the separation position Lb is imaged. It is thereby possible to efficiently acquire the unit image I2 by utilizing the period when the maintenance unit 5 moves to the move destination.

Further, the horizontal drive part 61 moves the maintenance unit 5 from the facing position La to the separation position Lb before starting the printing operation, and the imaging part 8 images the maintenance unit 5 passing through the imaging range Ri during the move from the facing position La to the separation position Lb (Step S103). It is thereby possible to efficiently acquire the condition of the maintenance unit 5 (the condition represented by the unit image I2) before starting the printing operation by utilizing the period when the maintenance unit 5 moves to the separation position Lb.

Furthermore, the horizontal drive part 61 moves the maintenance unit 5 from the separation position Lb to the facing position La after ending the printing operation, and the imaging part 8 images the maintenance unit 5 passing through the imaging range Ri during the move from the separation position Lb to the facing position La (Step S103). It is thereby possible to efficiently acquire the condition of the maintenance unit 5 (the condition represented by the unit image I2) after ending the printing operation by utilizing the period when the maintenance unit 5 moves to the facing position La.

In the above-described imaging process, while being associated with the history information I1, the unit image I2 can be stored in the storage part 12. Then, the control part 10 performs analysis of the unit image I2 stored in the storage part 12 at an appropriate timing.

Figure 11:
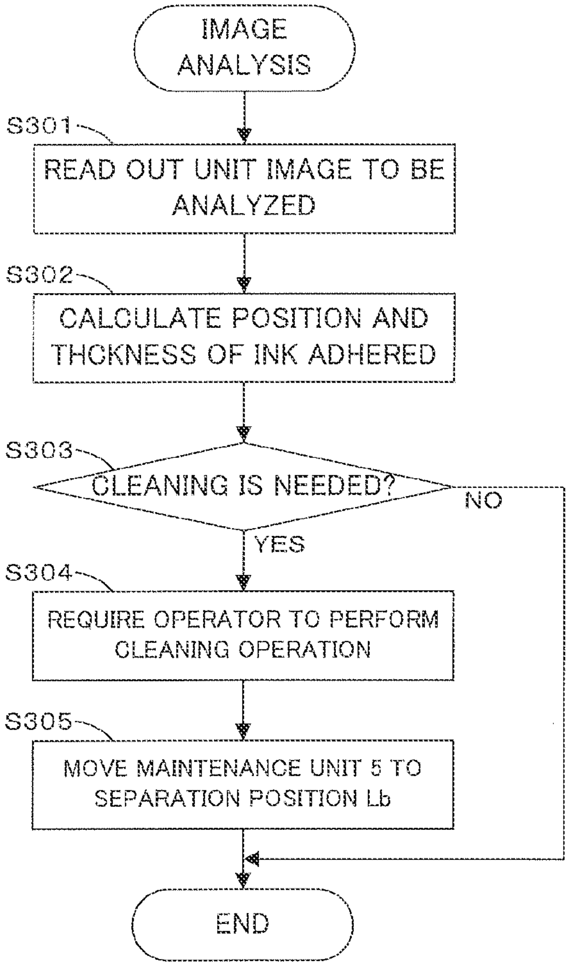
FIG. 11 is a flowchart showing a first example of an image analysis.

FIG. 11 is a flowchart showing a first example of an image analysis. The first example of the image analysis is performed, for example, before starting the printing operation or after ending the printing operation. In Step S301, the computation part 11 reads out the unit image I2 to be analyzed, for example, the unit image I2 acquired in the most-recent imaging process, from the storage part 12.

In Step S302, the computation part 11 calculates a position and a thickness of the ink adhered to the target portion (the seal member 53, the cap 52, or the like) in the maintenance unit 5, on the basis of the unit image I2. Specifically, the computation part 11 extracts an existence region of ink, which is represented by the unit image I2. Extraction of the existence region of ink can be performed in any one of various manners. For example, the existence region of ink can be extracted on the basis of the difference between the color of the ink and the color of surroundings of the ink.

Alternatively, an image (reference image) obtained by imaging the maintenance unit to which no ink or very little ink is adhered is stored as a determination criterion 14, and on the basis of a comparison between this reference image and the unit image I2, the existence region of the ink can be extracted. In this case, the control part 10 can check a change in the condition of the maintenance unit 5 on the basis of the comparison between the unit image I2 and the reference image. Note that the reference image representing the maintenance unit 5 to which no ink is adhered can be acquired by imaging a maintenance unit 5 unused for the maintenance, such as wipe, capping, and purge (i.e., a new maintenance unit 5). Further, the reference image representing the maintenance unit 5 to which very little ink is adhered can be acquired by imaging a maintenance unit 5 after performing the cleaning operation and before performing the maintenance. In such a configuration, the control part 10 can check a change in the condition of the maintenance unit 5 from a clean condition.

In a case where the upper surface of the seal member 53 is a target portion, as shown in FIG. 8, the camera 83 images the seal member 53 from a direction inclined with respect to the normal N (i.e., from diagonally above). Therefore, the unit image I2 includes both the side surface and the upper surface of the seal member 53. In contrast to this, in the storage part 12, a height of the side surface of the seal member 53 is stored as a reference height. Then, the computation part 11 obtains a thickness of the ink adhered to the seal member 53 on the basis of a result of the comparison between a size of an existence range of the ink extracted from the unit image I2 and a size of the reference height in a direction of the normal N (in other words, a height direction). Further, the computation part 11 obtains the existence range of the ink in a plane orthogonal to the height direction, as the position of the ink. Also in a case where the cap 52 is a target portion, a thickness and a position of the ink can be obtained in the same manner.

In Step S303, the computation part 11 determines whether or not the cleaning operation for the seal member 53 in the maintenance unit 5 is needed. Specifically, a thickness threshold value serving as a reference for determining whether or not the cleaning operation is needed is stored in the storage part 12 as the determination criterion 14. Then, the computation part 11 determines that the cleaning operation is needed when the thickness of the ink is not smaller than the thickness threshold value ("YES" in Step S303), and determines that the cleaning operation is not needed when the thickness of the ink is smaller than the thickness threshold value ("NO" in Step S303).

When the computation part 11 determines that the cleaning operation is needed, the computation part 11 displays, on the display 14, a message indicating that the cleaning operation is needed, to thereby require the operator to perform the cleaning operation (Step S304). Then, the computation part 11 moves the maintenance unit 5 to the separation position Lb (Step S305) and gets ready for the cleaning operation. In a case where the image analysis is performed before performing the printing operation, the printing operation to be performed is stopped and Steps S304 and S305 are executed.

In this first example, the control part 10 obtains information on the ink adhered to the maintenance unit 5, on the basis of the unit image I2 (Step S302). Thus, the control part 10 can check the condition of the ink adhered/deposited onto the maintenance unit 5, which is represented by the unit image I2.

Specifically, the control part 10 obtains the position in the maintenance unit 5, to which ink is adhered, on the basis of the unit image I2 (Step S302). Thus, the control part can check an adhesion position of the ink, which is represented by the unit image I2.

Further, the control part 10 obtains the thickness of the ink deposited on the maintenance unit 5 on the basis of the unit image (Step S302). Thus, the control part 10 can check the thickness of the ink, which is represented by the unit image I2.

Furthermore, the control part 10 stores a height of the side surface of the seal member 53 or the cap 52 (reference member) included in the maintenance unit 5, as the reference height (reference size). Then, the control part 10 obtains the thickness of the ink deposited on the maintenance unit 5 on the basis of the size ratio between the seal member 53 or the cap 52 and the ink, which are included in the unit image I2, and the reference height. In such a configuration, it is possible to easily obtain the thickness of the ink by the comparison with the reference height of the seal member 53 or the cap 52.

Figure 12:
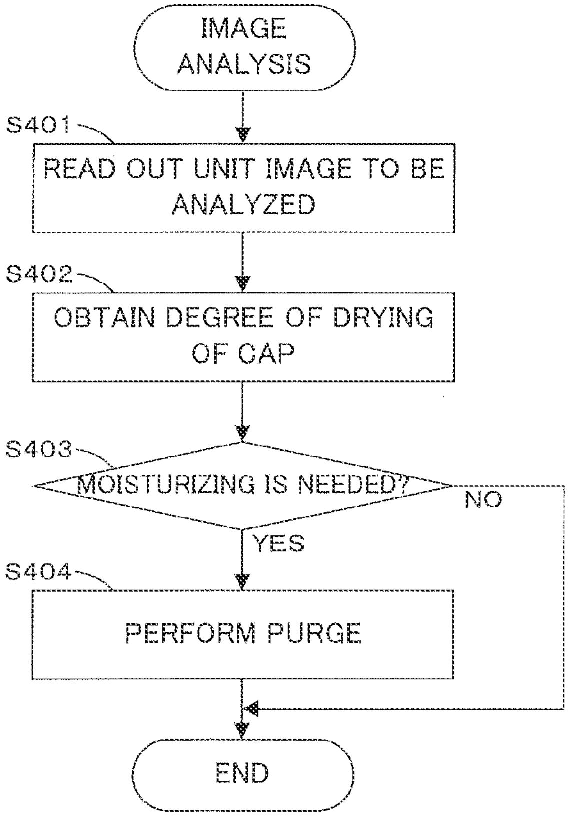
FIG. 12 is a flowchart showing a second example of the image analysis.

FIG. 12 is a flowchart showing a second example of the image analysis. The second example of the image analysis is performed, for example, after ending the printing operation. In Step S401, the computation part 11 reads out the unit image I2 to be analyzed, for example, the unit image I2 acquired in the most-recent imaging process, from the storage part 12.

In Step S402, the computation part 11 obtains the degree of drying of the ink absorbing member 526 provided in the cap 52 in the maintenance unit 5, on the basis of the unit image I2. Specifically, when the ink absorbing member 526 is wet, there is a tendency that a region in the unit image I2 which corresponds to the ink absorbing member 526 has luster and the luminance of a pixel included in the region becomes higher. Then, the computation part 11 calculates an average value or a median of the luminance of the region as a dry index value indicating the degree of drying of the ink absorbing member 526. In other words, as the ink absorbing member 526 becomes drier, this dry index value indicates a smaller value.

In Step S403, the computation part 11 determines whether or not moisturizing of the ink absorbing member 526 is needed. Specifically, a luminance threshold value serving as a reference for determining whether or not the moisturizing is needed is stored in the storage part 12 as the determination criterion 14. Then, the computation part 11 determines that the moisturizing is needed when the dry index value is not larger than the luminance threshold value ("YES" in Step S403), and determines that the moisturizing is not needed when the dry index value is larger than the luminance threshold value ("NO" in Step S403).

When the computation part 11 determines that the moisturizing is needed, the computation part 11 performs a purge as shown in FIG. 6B, so that the ink absorbing member 526 is moisten by the ink ejected from the ejection head 31. It is thereby possible to perform the capping (Step S101), which is to be performed subsequently, under sufficient humidity and suppress drying of the nozzle 311 of the ejection head 31.

In this second example, the control part 10 obtains information (dry index value) on the degree of drying of the maintenance unit 5 on the basis of the unit image I2 acquired by the imaging part 8 (Step S402). In such a configuration, when it is determined that the drying of the maintenance unit 5 progresses, it is possible to perform procedures as appropriate, such as moistening of the maintenance unit 5 by the ink ejected from the ejection head 31 (Step S404).

As described above, in the first example and the second example of the image analysis, the control part 10 obtains the condition of the maintenance unit 5 (an adhesion range of the ink and the degree of drying of the cap 52) on the basis of the unit image I2 acquired by the imaging part 8. Thus, the control part 10 can check the condition of the maintenance unit 5, which is represented by the unit image I2.

Figure 13:
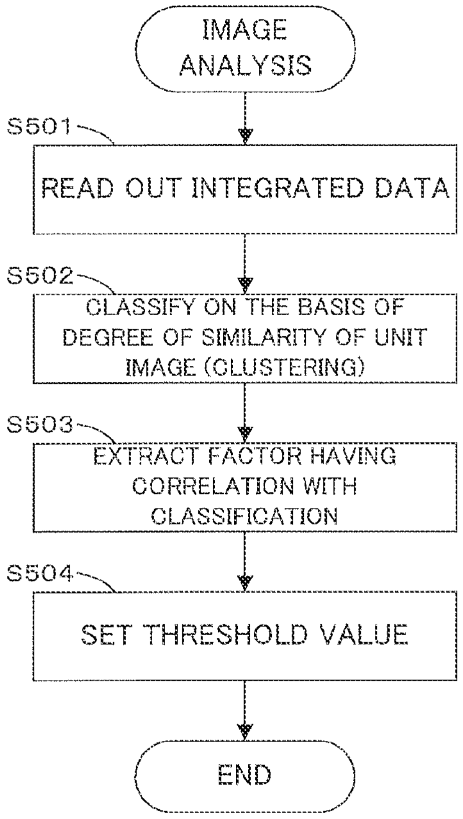
FIG. 13 is a flowchart showing a third example of the image analysis.

FIG. 13 is a flowchart showing a third example of the image analysis. In Step S501, the control part 10 reads out the accumulated integrated data 13 from the storage part 12. In Step S502, the control part 10 classifies the integrated data 13 on the basis of the degree of similarity of the unit image I2 included in the integrated data 13. This classification can be performed, for example, by clustering. It can be thought that the difference in the classification destination of the unit image I2 in Step S502 indicates the difference in the adhesion condition of ink to the maintenance unit 5.

In Step S503, the computation part 11 extracts a factor having a correlation with the classification destination of the unit image I2. Among the factors shown in FIG. 9, for example, the amount of ejected ink (variable) is extracted. Then, the computation part 11 determines whether or not the cleaning operation is needed on the basis of the extracted factor (the amount of ejected ink). Specifically, the computation part 11 sets a threshold value for the amount of ejected ink (Step S504). This setting of the threshold value can be performed in any one of various manners. It is possible, for example, to cause the operator to determine/input the threshold value for the amount of ejected ink while displaying a correspondence between the unit image I2 and the amount of ejected ink on the display 14.

In the printing operation to be performed after that, the computation part 11 resets the amount of ejected ink to zero every time when the cleaning operation is performed and counts the amount of ejected ink after the cleaning operation. Then, when the amount of ejected ink becomes not smaller than the threshold value, the control part 10 determines that the cleaning operation is needed and displays, on the display 14, a message indicating that the cleaning operation is needed, to thereby require the operator to perform the cleaning operation.

In the above-described exemplary case, the control part 10 accumulates the unit image I2 while associating the unit image I2 with the history information I1 on the history of the printing operation which was performed by the ejection head 31 until the unit image I2 is acquired (FIG. 9). The unit image I2 accumulated, being associated with the history information I1 thus, is useful to analyze the correlation relation between the history of the printing operation and the condition of the maintenance unit 5, which is represented by the unit image I2.

Further, the control part 10 obtains a variable having a correlation in the change of the condition of the maintenance unit 5 along with execution of the printing operation, on the basis of a result of accumulating the unit image I2 and the history information I1 (Step S503). In such a configuration, it becomes possible to determine whether or not cleaning of the maintenance unit 5 is needed, on the basis of a value of the variable.

Further, the control part 10 obtains a timing of performing the cleaning of the maintenance unit 5 on the basis of the variable. In such a configuration, it is possible to accurately obtain a cleaning timing of the maintenance unit 5.

Figure 14:
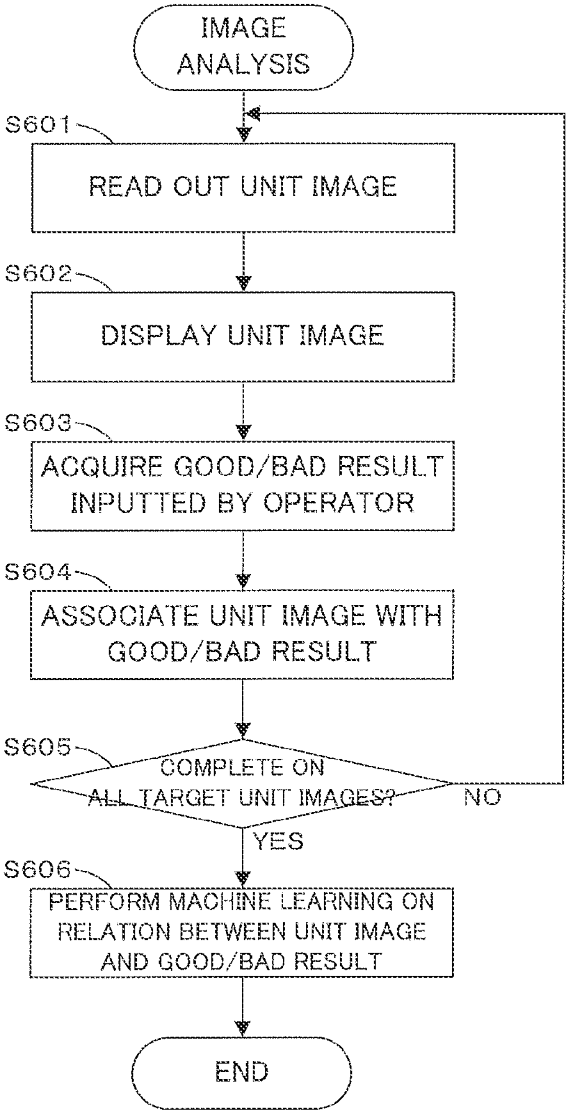
FIG. 14 is a flowchart showing a fourth example of the image analysis.

FIG. 14 is a flowchart showing a fourth example of the image analysis. The control part 10 reads out the unit image I2 from the storage part 12 (Step S601) and displays the unit image I2 on the display 14 (Step S602). By checking the unit image I2, the operator can thereby grasp the adhesion condition of the ink on the maintenance unit 5 and input "Good" or "Bad" of the adhesion condition to the display 14. Herein, "Good" indicates the operator's determination that the cleaning operation of the maintenance unit 5 is not needed, and "Bad" indicates the operator's determination that the cleaning operation of the maintenance unit 5 is needed.

The computation part 11 acquires the good-or-bad result inputted by the operator (Step S603), and associates the unit image I2 with the good-or-bad result and stores the unit image I2 in the storage part 12 (Step S604). Thus, training data for machine learning can be generated. In Step S605, it is determined whether or not Steps S601 to S604 are completed on all the target unit images I2 (for example, the unit images I2 acquired after a predetermined date). Then, when Steps S601 to S604 are completed on all the unit images I2 ("YES" in Step S605), the computation part 11 performs machine learning on a relation between the unit image I2 and the good-or-bad result, on the basis of the generated training data (Step S606).

In the printing operation to be performed after that, the computation part 11 determines whether or not the cleaning operation of the maintenance unit 5 is needed, on the basis of a learning result of the machine learning and the unit image I2 acquired by the imaging part 8. Then, when it is determined that the cleaning operation is needed, the computation part 11 displays, on the display 14, a message indicating that the cleaning operation is needed, to thereby require the operator to perform the cleaning operation.

Thus, the display 14 (display part) is provided to display the unit image I2 acquired by the imaging part 8 to the operator. For this reason, the operator can grasp the condition of the maintenance unit 5 from the unit image I2 displayed on the display 14 and easily determine whether or not cleaning of the maintenance unit 5 is needed.

Further, the control part 10 generates the training data for the machine learning from the unit image I2 (Step S604). In such a configuration, it is possible to easily generate the training data.

In each of the above-described exemplary image analyses, the control part 10 analyzes the unit image I2 acquired by the imaging part 8. In such a configuration, with the analysis of the unit image I2, it is possible to extract information included in the unit image I2.

Figure 15:
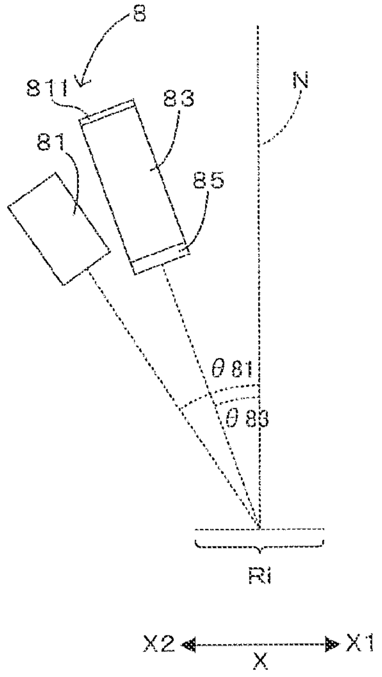
FIG. 15 is a view schematically showing a second example of the configuration of the imaging part.

FIG. 15 is a view schematically showing a second example of the configuration of the imaging part. The imaging part 8 shown in FIG. 15 has a color filter 85. The color filter 85 is provided between the camera 83 and the imaging range Ri, and the camera 83 captures light passing through the color filter 85 among the light emitted from the lighting 81 and reflected by the imaging range Ri.

This color filter 85 allows a specific wavelength to pass therethrough and limits passage of light having any wavelength other than the specific wavelength, to thereby make the light having the specific wavelength selectively pass the color filter 85. Especially, in the printer 1, provided are a plurality of imaging parts 8 corresponding to the plurality of head units 3 for ejecting inks of respective different colors. Then, each of the plurality of imaging parts 8 includes the color filter 85 which makes the light selectively pass the color filter 85, the light having a wavelength corresponding to the complementary color of the color of the ink ejected from the corresponding head unit 3.

Specifically, the color filter 85 of the imaging part 8 provided corresponding to the head unit 3 which ejects ink of cyan (C) makes light having a wavelength of red (R) selectively passes therethrough, the color filter 85 of the imaging part 8 provided corresponding to the head unit 3 which ejects ink of magenta (M) makes light having a wavelength of green (G) selectively passes therethrough, the color filter 85 of the imaging part 8 provided corresponding to the head unit 3 which ejects ink of yellow (Y) makes light having a wavelength of blue (B) selectively passes therethrough, and the color filter 85 of the imaging part 8 provided corresponding to the head unit 3 which ejects ink of black (K) makes light having a wavelength of red (R) selectively passes therethrough.

Thus, the imaging part 8 has the color filter 85 (filter) making light having a predetermined wavelength selectively passing therethrough and the area sensor 811 (image sensor) detecting the light emitted from the imaging range Ri and passing through the color filter 85 to image the imaging range Ri. Then, each of the plurality of color filters 85 makes light selectively passes, the light having a wavelength (the wavelength of the complementary color of the ink) corresponding to the color of the ink ejected from the ejection head 31 of the corresponding head unit 3. In such a configuration, it is possible to vividly take the ink adhered/deposited on the maintenance unit 5 onto the unit image I2.

Instead of providing the color filter 85, by limiting the wavelength of the light to be emitted onto the imaging range Ri from the lighting 81, the same technical effect can be produced. Specifically, the lighting 81 has only to be configured to selectively emit the light having a wavelength corresponding to a specific color, not white light. In this variation, each imaging part 8 emits light having a wavelength corresponding to the complementary color of the color of the ink ejected from the corresponding head unit 3. Specifically, the lighting 81 of the imaging part 8 provided corresponding to the head unit 3 which ejects ink of cyan (C) emits light having a wavelength of red (R), the lighting 81 of the imaging part 8 provided corresponding to the head unit 3 which ejects ink of magenta (M) emits light having a wavelength of green (G), the lighting 81 of the imaging part 8 provided corresponding to the head unit 3 which ejects ink of yellow (Y) emits light having a wavelength of blue (B), and the lighting 81 of the imaging part 8 provided corresponding to the head unit 3 which ejects ink of black (K) emits light having a wavelength of red (R).

Thus, each of the plurality of imaging parts 8 images the imaging range Ri while emitting light having a wavelength (the wavelength of the complementary color of the ink) corresponding to the color of the ink ejected from the ejection head 31 of the corresponding head unit 3, to the imaging range Ri. In such a configuration, it is possible to vividly take the ink adhered/deposited on the maintenance unit 5 onto the unit image I2.

In the above-described exemplary cases, a plurality of printing units each including the head unit 3, the maintenance unit 5, the horizontal drive part 61, and the imaging part 8 are arranged in the Y direction (transfer direction of the web W by the transfer part 2). Then, the plurality of head units 3 included in the respective different printing units eject inks of respective different colors from the respective ejection heads 31 onto the web W being transferred by the transfer part 2 (base material transfer part). In other words, the maintenance unit 5, the horizontal drive part 61, and the imaging part 8 are provided for each of the plurality of head units 3 which eject inks of respective different colors. On the other hand, the plurality of imaging parts 8 have respective different configurations (the color filters 85 or the lightings 81) corresponding to the colors of the inks ejected from the ejection heads 31 of the corresponding head units 3, respectively. It is thereby possible to acquire the unit image I2 by using the appropriate configuration (the color filter 85 or the lighting 81) corresponding to the color of the ink to be taken in the unit image I2.

Figure 16:
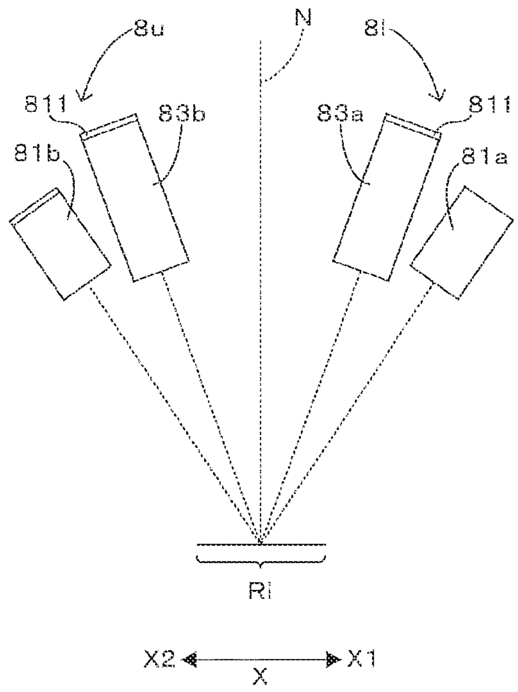
FIG. 16 is a view schematically showing a third example of the configuration of the imaging part.

FIG. 16 is a view schematically showing a third example of the configuration of the imaging part. This imaging part 8 has a lighting 81*a* and a camera 83*a* which are inclined toward the one side X1 with respect to the normal N and a lighting 81*b* and a camera 83*b* which are inclined toward the other side X2. The lighting 81*a* emits light to the imaging range Ri from diagonally above, being inclined toward the one side X1 with respect to the normal N and the camera 83*a* images the imaging range Ri from diagonally above, being inclined toward the one side X1 with respect to the normal N. It is thereby possible to image the target portion from the one side X1. The lighting 81*b* emits light to the imaging range Ri from diagonally above, being inclined toward the other side X2 with respect to the normal N and the camera 83*b* images the imaging range Ri from diagonally above, being inclined toward the other side X2 with respect to the normal N. It is thereby possible to image the target portion from the other side X2.

Further, also in the imaging part 8 of the third example, variations can be added as appropriate, such as providing the color filter 85 which selectively allows the specific wavelength corresponding to the complementary color of the color of the ink to pass therethrough, or providing the lightings 81*a* and 81*b* which each emit light having a specific wavelength.

The mode of use of the imaging part 8 shown in FIG. 16 can be thought variously. For example, the control part 10 can calculate the three-dimensional shape of the maintenance unit 5 and the ink adhered to the maintenance unit 5, on the basis of the disparity obtained by performing stereo matching for the unit image I2 of the maintenance unit 5 imaged by the camera 83*a* and the unit image I2 imaged by the camera 83*b*. Therefore, in above-described Step S302, it is possible to obtain the thickness of the ink adhered to the maintenance unit 5 on the basis of the three-dimensional shape of the ink.

In such an aspect, the control part 10 obtains the thickness of the ink deposited on the maintenance unit 5 on the basis of the plurality of unit images I2 acquired by imaging the ink deposited on the maintenance unit 5 from different directions respectively. It is thereby possible to accurately obtain the thickness of the ink from the disparity of the unit images I2.

Specifically, the imaging part 8 has the plurality of cameras 83*a* and 83*b* imaging the imaging range Ri from respective different directions. The control part 10 obtains the three-dimensional shape of the ink (target) represented by the unit image I2, on the basis of the unit images I2 acquired by the plurality of cameras 83*a* and 83*b*, respectively. In such a configuration, it is possible to accurately obtain the three-dimensional shape of the ink on the basis of the disparity of the plurality of unit images I2 imaged by the plurality of cameras 83*a* and 83*b*, respectively.

Alternatively, there may be a configuration where imaging of the maintenance unit 5 moving from the facing position La to the separation position Lb is performed by the lighting 81*a* and the camera 83*a* and imaging of the maintenance unit 5 moving from the separation position Lb to the facing position La is performed by the lighting 81*b* and the camera 83*b*. Conversely, there may be another configuration where imaging of the maintenance unit 5 moving from the facing position La to the separation position Lb is performed by the lighting 81*b* and the camera 83*b* and imaging of the maintenance unit 5 moving from the separation position Lb to the facing position La is performed by the lighting 81*a* and the camera 83*a*.

In such an aspect, the imaging part 8 can image the maintenance unit 5 passing through the imaging range Ri while emitting light from different directions between an outward way and a return way of the maintenance unit 5 reciprocating between the facing position La and the separation position Lb, respectively. It is thereby possible to acquire the conditions of different portions of the maintenance unit 5 while emitting light to the different portions.

Figure 17:
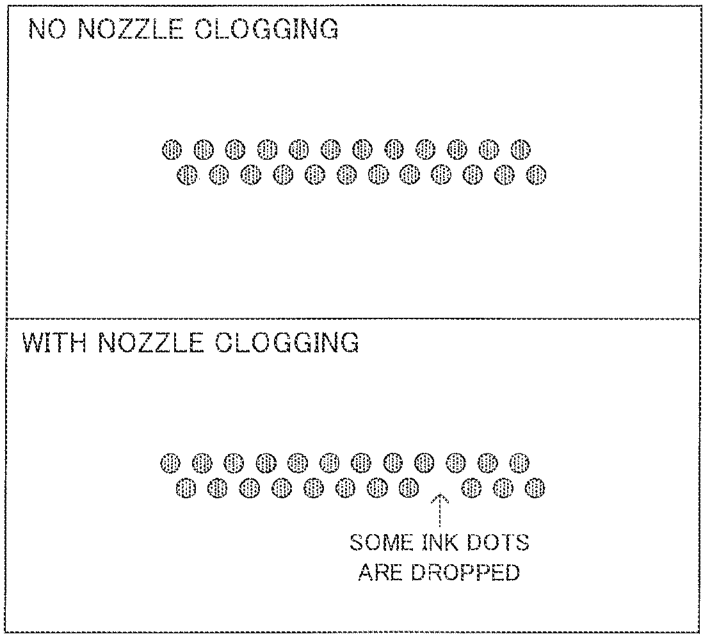
FIG. 17 is a view schematically showing a variation of control based on an unit image obtained by imaging the maintenance unit.

In the execution of Step S101 to S105 of FIG. 7, various controls can be performed by ejecting ink from the ejection head 31 onto the ink absorbing member 526 and then imaging the maintenance unit. FIG. 17 is a view schematically showing a variation of control based on the unit image obtained by imaging the maintenance unit. In FIG. 17, a hatched dot indicates a dot (ink dot) formed of ink landed onto the ink absorbing member 526.

In this variation, in Step S101, the control part 10 tries ejection of ink from the plurality of nozzles 311 of the ejection head 31. Specifically, the control part 10 transmits a drive signal for driving the nozzles 311 of the ejection head 31 to each of the plurality of nozzles 311.

In a case where there is no nozzle clogging in each of the plurality of nozzles 311 of the ejection head 31, each of the plurality of nozzles 311 ejects ink in response to the received drive signal. As a result, as shown in the upper field of "no nozzle clogging" of FIG. 17, a plurality of ink dots in accordance with the arrangement of the plurality of nozzles 311 are formed on the ink absorbing member 526. On the other hand, in a case where there occurs nozzle clogging in any one of the plurality of nozzles 311 of the ejection head 31, the nozzle 311 with no nozzle clogging ejects ink in response to the received drive signal, and the nozzle 311 with nozzle clogging cannot appropriately eject ink in response to the received drive signal. As a result, as shown in the lower field of "with nozzle clogging" of FIG. 17, in the arrangement of the plurality of ink dots in accordance with the arrangement of the plurality of nozzles 311, some ink dots are dropped.

Then, in Step S103, the unit image I2 is obtained by imaging the ink absorbing member 526 on which the ink dots are formed. Therefore, the control part 10 can check whether or not there is nozzle clogging or identify the nozzle 311 in which nozzle clogging occurs, on the basis of the unit image I2.

Thus, the imaging part 8 images the ink ejected onto the maintenance unit 5 from the nozzle 311 of the ejection head 31 to thereby acquire the unit image I2, and the control part obtains the condition of the nozzle 311 of the ejection head 31 on the basis of the unit image I2. In such a configuration, the control part 10 can accurately check an ejection failure of the nozzle 311, or the like.

The content determined on the basis of the unit image I2 which is acquired after the ink dots are landed on the ink absorbing member 526 is not limited to the above-described exemplary case. For example, when the ink absorbing member 526 is dry, the ink dots are absorbed by the ink absorbing member 526 and the ink dots are rapidly faded with the passage of time. Therefore, the degree of drying of the ink absorbing member 526 may be determined on the basis of the depth of the ink dots represented by the unit image I2. The determination in Step S402 in the flowchart of FIG. 12, for example, can be performed on the basis of the depth of the ink dots.

As described above, in the present embodiment, the printer 1 corresponds to one example of a "printer" of the present invention, the control part 10 corresponds to one example of a "control part" of the present invention, the display 14 corresponds to one example of a "display part" of the present invention, the transfer part 2 corresponds to one example of a "base material transfer part" of the present invention, the ejection head 31 corresponds to one example of an "ejection head" of the present invention, the nozzle 311 corresponds to one example of a "nozzle" of the present invention, the maintenance unit 5 corresponds to one example of a "maintenance unit" of the present invention, the horizontal drive part 61 corresponds to one example of a "drive part" of the present invention, the imaging part 8 corresponds to one example of an "imaging part" of the present invention, the lighting 81 corresponds to one example of a "lighting" of the present invention, the area sensor 811 corresponds to one example of an "image sensor" of the present invention, the camera 83 corresponds to one example of a "camera" of the present invention, the color filter corresponds to one example of a "filter" of the present invention, the head unit 3, the maintenance unit 5, the horizontal drive part 61, and the imaging part 8 constitute one example of a "printing unit" of the present invention, the facing position La corresponds to one example of a "facing position" of the present invention, the separation position Lb corresponds to one example of a "separation position" of the present invention, the imaging range Ri corresponds to one example of an "imaging range" of the present invention, the history information I1 corresponds to one example of "history information" of the present invention, the unit image I2 corresponds to one example of a "unit image" of the present invention, and the web W corresponds to one example of a "base material" of the present invention.

Further, the present invention is not limited to the above-described embodiment, but numerous modifications and variations other than those described above can be devised without departing from the scope of the invention. For example, the three-dimensional shape of ink may be obtained as shown in the following variation. In this variation, the imaging range Ri is imaged at each of two different timings during a period while the target portion (adhesion portion of ink) passes through the imaging range Ri. Thus, the two unit images I2 acquired at the two timings indicate results of imaging the target portion from respective different angles. Then, the control part 10 can calculate the three-dimensional shape of ink adhered to the target portion on the basis of the disparity obtained by performing stereo matching for the two unit images I2.

Specifically, the control part 10 obtains the three-dimensional shape of the target portion (target) represented by the unit image I2 on the basis of the plurality of unit images I2 acquired by the imaging part 8 in the states where the maintenance unit 5 is positioned at different positions in the X direction. In such a configuration, the control part 10 can accurately obtain the three-dimensional shape of the target portion on the basis of the disparity of the plurality of unit images I2.

Further, a portion to be imaged in the maintenance unit 5 is not limited to the above-described example. For example, the wiper 54 in the maintenance unit 5 is imaged, to thereby acquire the unit image I2. It is possible to determine whether or not the cleaning operation for the wiper 54 is needed, on the basis of the unit image I2.

Furthermore, as described above, the cap 52 is fitted into the cap insertion hole 511 of the base member 51. The cap 52, however, does not necessarily need to be provided separately from the base member 51. In other words, the cap 52 and the base member 51 may be formed integrally.

Further, the arrangement and configuration of the camera 83 can be changed as appropriate. The camera 83 may be configured, for example, to image the imaging range Ri by using a line sensor, instead of the area sensor 811.

Furthermore, in order to move the maintenance unit 5 relative to the head unit 3, the head unit 3 may be driven, instead of the maintenance unit 5. In short, at least one drive target of the ejection head and the maintenance unit may be driven.

Further, the unit image I2 may be stored and accumulated without being associated with the history information I1.

Furthermore, the position of the imaging range Ri may be changed as appropriate. For example, the imaging range Ri may be provided to overlap the separation position Lb. Specifically, the imaging range Ri can be provided at an end on the side of the facing position La in the separation position Lb.

Further, the cover member 63 is not indispensable but may be omitted from the printer 1.

Figure 18:
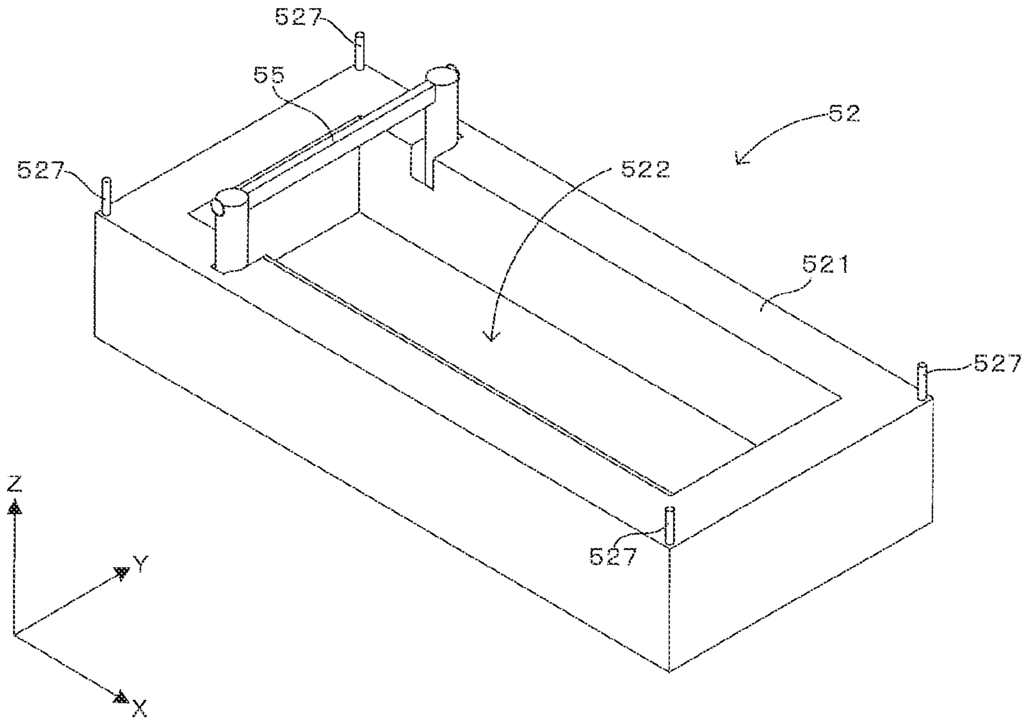
FIG. 18 is a view showing a variation of the maintenance unit.

Furthermore, the configuration of the maintenance unit 5 may be changed as appropriate. FIG. 18 is a view showing a variation of the maintenance unit. This maintenance unit 5 has a pre-wiper 55. Especially, the pre-wiper 55 is provided for a cap 52 on the upmost-stream side in the cleaning direction (direction from the facing position La toward the separation position Lb) among the plurality of caps 52 included in the cap row C52. This pre-wiper 55 performs the function of scraping off the ink from the ejection head 31 before the wiper 54 does.

In the above-described embodiment, the operator instructs the control part 10 to start the printing operation, and the imaging part 8 images the maintenance unit 5 in the course while the maintenance unit 5 performs the capping operation of the head unit 3. Further, the operator instructs the control part 10 to end the printing operation, and the imaging part 8 images the maintenance unit 5 in the course while the maintenance unit 5 performs a cap opening operation of the head unit 3. In other words, with the operator's instruction to start or end the printing operation as a trigger, the imaging part 8 images the maintenance unit 5. The trigger for the imaging part 8 to image the maintenance unit 5, however, is not limited to the above-described one. For example, from the display 14, the operator may instruct the control part 10 to image the maintenance unit 5 at any timing during execution or suspension of the printing operation of the printer 1.

In the former case, when the operator instructs the control part 10, from the display 14, to image the maintenance unit 5, the control part 10 temporarily stops the printing operation of the printer 1 and moves the maintenance unit 5 from the separation position Lb toward the facing position La in the X direction. In the course while the maintenance unit moves from the separation position Lb toward the facing position La, the imaging part 8 images the maintenance unit 5.

In the latter case, when the operator instructs the control part 10, from the display 14, to image the maintenance unit 5, the control part 10 causes the maintenance unit 5 to temporarily stop capping of the head unit 3 and moves the maintenance unit 5 from the facing position La toward the separation position Lb in the X direction. In the course while the maintenance unit 5 moves from the facing position La toward the separation position Lb, the imaging part 8 images the maintenance unit 5.

Further, imaging of the maintenance unit 5 performed by the imaging part 8 does not necessarily need to use the operator's instruction as a trigger. For example, the imaging part 8 may perform imaging of the maintenance unit 5 every time when the printing process elapses a predetermined time.

In the embodiment in accordance with FIG. 16 described earlier, the imaging parts 8 are disposed on the X1 side and the X2 side of the normal N, sandwiching the imaging range Ri therebetween, and the imaging part 8 (imaging part 81) positioned on the X1 side relative to the normal N images the imaging range Ri from the X1 side with respect to the normal and the imaging part 8 (imaging part 8*u*) positioned on the X2 side relative to the normal N images the imaging range Ri from the X2 side with respect to the normal. The imaging range Ri can be thereby imaged by the two imaging parts 8 from both sides of the normal N.

The mechanism for imaging the imaging range Ri from both sides of the normal N, however, is not limited to the above-described one. For example, there may be a configuration where a single imaging part 8 is movable between the X1 side and the X2 side of the normal N by a desired moving means. In this case, before moving the maintenance unit 5 from the X2 side toward the X1 side with respect to the normal N, the imaging part 8 is made positioned on the X1 side relative to the normal N of the imaging range Ri. In this state, by moving the maintenance unit 5 from the X2 side to the X1 side with respect to the normal, the imaging range Ri is imaged from the X1 side relative to the normal N. Then, when the maintenance unit 5 is moved from the X1 side to the X2 side with respect to the normal N, the moving means moves the imaging part 8 to the X2 side relative to the normal N in advance. In this state, by moving the maintenance unit 5 from the X1 side to the X2 side with respect to the normal, the imaging part 8 can image the imaging range Ri from the X2 side relative to the normal N. Thus, without disposing the imaging parts 8 on both sides of the normal N, it becomes possible to image the imaging range Ri from both sides of the normal N.

INDUSTRIAL APPLICABILITY

The present invention can be applied to a general technology to perform maintenance on the ejection head for ejecting ink, by using the maintenance unit.

REFERENCE SIGN

1 . . . printer
10 . . . control part
14 . . . display (display part)
2 . . . transfer part (base material transfer part)
3 . . . head unit (printing unit)
31 . . . ejection head
311 . . . nozzle
5 . . . unit (drive target, printing unit)
61 . . . horizontal drive part (drive part, printing unit)
8 . . . imaging part (printing unit)
81 . . . lighting
811 . . . area sensor (image sensor)
83 . . . camera
85 . . . filter (filter)
La . . . facing position
Lb . . . separation position
Ri . . . imaging range
I1 . . . history information
I2 . . . unit image
W . . . web (base material)

The invention claimed is:

1. A printer, comprising:

an ejection head having a nozzle that ejects ink and configured to perform a printing operation of ejecting ink onto a base material from the nozzle;

a maintenance unit configured to perform maintenance on the ejection head;

a drive part configured to move the maintenance unit relative to the ejection head between a facing position facing the ejection head and a separation position away from the facing position in a driving direction by driving at least one drive target of the ejection head and the maintenance unit in the driving direction;

an imaging part configured to image an imaging range provided on a side of the separation position relative to the facing position in the driving direction; and a cover member which faces the maintenance unit positioned at the separation position from above, wherein the maintenance unit positioned at the facing position performs maintenance on the ejection head, the maintenance unit positioned at the separation position is away from the ejection head in the driving direction, the maintenance unit moves relative to the imaging range along with driving of the drive target by the drive part, and the imaging part faces the imaging range through a space between the ejection head and the cover member, and images at least part of the maintenance unit which overlaps the imaging range in accordance with the driving of the drive target by the drive part, to thereby acquire a unit image.

2. A printer comprising:

an ejection head having a nozzle that ejects ink and configured to perform a printing operation of ejecting ink onto a base material from the nozzle;

a maintenance unit configured to perform maintenance on the ejection head;

a drive part configured to move the maintenance unit relative to the ejection head between a facing position facing the ejection head and a separation position away from the facing position in a driving direction by driving at least one drive target of the ejection head and the maintenance unit in the driving direction;

an imaging part configured to image an imaging range provided on a side of the separation position relative to the facing position in the driving direction; and a display part configured to display the unit image acquired by the imaging part to an operator, wherein the maintenance unit positioned at the facing position performs maintenance on the ejection head, the maintenance unit positioned at the separation position is away from the ejection head in the driving direction, the maintenance unit moves relative to the imaging range along with driving of the drive target by the drive part, and the imaging part images at least part of the maintenance unit which overlaps the imaging range in accordance with the driving of the drive target by the drive part, to thereby acquire a unit image.

3. The printer according to claim 2, further comprising:

a base material transfer part configured to transfer the base material in a transfer direction, wherein a plurality of printing units each having the ejection head, the maintenance unit, the drive part, and the imaging part are arranged in the transfer direction, the plurality of printing units eject inks of respective different colors from the respective ejection heads onto the base material which is transferred by the base material transfer part, and the respective imaging parts of the plurality of printing units have respective different configurations in accordance with the respective colors of the inks which the printing units, to which the imaging parts belong respectively, eject from the respective ejection heads.

4. The printer according to claim 3, wherein the imaging part in each of the plurality of printing units images the imaging range while emitting light to the imaging range, the light having a wavelength in accordance with the color of the ink which the printing unit, to which the imaging part belongs, ejects from the ejection head.

5. The printer according to claim 3, wherein the imaging part has a filter making light having a predetermined wavelength selectively pass through the filter and an image sensor imaging the imaging range by detecting the light having emitted from the imaging range and passed through the filter, and the filter in each of the plurality of printing units makes light having a wavelength selectively pass through the filter, the wavelength in accordance with the color of the ink which the printing unit, to which the filter belongs, ejects from the ejection head.

6. The printer according to claim 2, further comprising:

a control part configured to analyze the unit image acquired by the imaging part.

7. The printer according to claim 6, wherein the control part obtains a condition of the maintenance unit on the basis of the unit image acquired by the imaging part.

8. The printer according to claim 7, wherein the control part obtains information on the ink adhered to the maintenance unit, on the basis of the unit image.

9. The printer according to claim 8, wherein the control part obtains a position to which the ink is adhered in the maintenance unit, on the basis of the unit image.

10. The printer according to claim 8, wherein the control part obtains a thickness of the ink deposited on the maintenance unit, on the basis of the unit image.

11. The printer according to claim 10, wherein the control part stores a size of a reference member included in the maintenance unit as a reference size and obtains the thickness of the ink deposited on the maintenance unit on the basis of a size ratio between the reference member and the ink, which are included in the unit image, and the reference size.

12. The printer according to claim 10, wherein the control part obtains the thickness of the ink deposited on the maintenance unit on the basis of a plurality of unit images acquired by imaging the ink deposited on the maintenance unit from different directions respectively.

13. The printer according to claim 6, wherein the control part obtains information on the degree of drying of the maintenance unit on the basis of the unit image acquired by the imaging part.

14. The printer according to claim 6, wherein the control part stores a reference image obtained by imaging the maintenance unit in a predetermined condition by the imaging part and obtains a condition of the maintenance unit on the basis of a comparison between the unit image and the reference image.

15. The printer according to claim 14, wherein the predetermined condition is a condition in which the maintenance unit is an unused new one or a condition in which the maintenance unit has been cleaned in the maintenance.

16. The printer according to claim 6, wherein the imaging part images ink which the ejection head ejects onto the maintenance unit from the nozzle, to thereby acquire the unit image, and the control part obtains a condition of the nozzle of the ejection head.

17. The printer according to claim 6, wherein the control part obtains a three-dimensional shape of a target included in the unit image on the basis of a plurality of unit images acquired by the imaging part in states where the maintenance unit is positioned at different positions in the driving direction.

18. The printer according to claim 6, wherein the imaging part has a plurality of cameras imaging the imaging range from respective different directions, and the control part obtains a three-dimensional shape of a target included in the unit image on the basis of the unit image acquired by each of the plurality of cameras.

19. The printer according to claim 6, wherein the control part accumulates the unit image while associating the unit image with history information on a history of the printing operation which was performed by the ejection head until the unit image is acquired.

20. The printer according to claim 19, wherein the control part obtains a variable having a correlation in the change of the condition of the maintenance unit along with execution of the printing operation, on the basis of a result of accumulating the unit image and the history information.

21. The printer according to claim 20, wherein the control part obtains a timing of performing cleaning of the maintenance unit on the basis of the variable.

22. The printer according to claim 6, wherein the control part generates training data for machine learning from the unit image.

23. The printer according to claim 2, wherein the imaging part has a plurality of lightings emitting light to the imaging range from respective different directions, and the lighting which emits light to the maintenance unit moving in an outward way from the facing position toward the separation position and the lighting which emits light to the maintenance unit moving in a return way from the separation position toward the facing position are different from each other.

24. The printer according to claim 2, wherein the imaging range is provided between the facing position and the separation position in the driving direction.

25. The printer according to claim 24, wherein the imaging part images the maintenance unit relatively passing through the imaging range along with the move between the facing position and the separation position.

26. The printer according to claim 25, wherein the drive part moves the maintenance unit from the facing position to the separation position before starting the printing operation, and the imaging part images the maintenance unit passing through the imaging range during moving from the facing position to the separation position.

27. The printer according to claim 25, wherein the drive part moves the maintenance unit from the separation position to the facing position after ending the printing operation, and the imaging part images the maintenance unit passing through the imaging range during moving from the separation position to the facing position.

28. A printing method, comprising:
performing maintenance on an ejection head having a nozzle ejecting ink, by a maintenance unit positioned at a facing position facing the ejection head;
performing a printing operation of ejecting ink onto a base material from the nozzle by the ejection head while causing the maintenance unit to be positioned at a separation position away from the facing position in a driving direction of the maintenance unit; and
imaging an imaging range provided on a side of the separation position relative to the facing position in the driving direction, by an imaging part,
wherein the imaging part that faces the imaging range through a space between the ejection head and a cover member images at least part of the maintenance unit which overlaps the imaging range, to thereby acquire a unit image, and
wherein the cover member faces the maintenance unit positioned at the separation position from above.

* * * * *